US012657617B2

(12) United States Patent
Terrell et al.

(10) Patent No.: US 12,657,617 B2
(45) Date of Patent: *Jun. 16, 2026

(54) SYSTEM, METHOD, AND APPARATUS FOR A DIGITAL TRADING CARD PLATFORM

(71) Applicant: All-Stars IP, LLC, Dallas, TX (US)

(72) Inventors: Scott Terrell, McKinney, TX (US); Lucien B. Crosland, Dallas, TX (US); Chad Meyer, Florence, TX (US); John A. Scully, Dallas, TX (US)

(73) Assignee: All-Stars IP, LLC, Dallas, TX (US)

( * ) Notice: Subject to any disclaimer, the term of this patent is extended or adjusted under 35 U.S.C. 154(b) by 459 days.

This patent is subject to a terminal disclaimer.

(21) Appl. No.: 18/091,769

(22) Filed: Dec. 30, 2022

(65) Prior Publication Data

US 2024/0095801 A1      Mar. 21, 2024

Related U.S. Application Data

(63) Continuation-in-part of application No. 17/946,745, filed on Sep. 16, 2022, now Pat. No. 11,830,087.

(51) Int. Cl.
G06Q 30/0601 (2023.01)
G06Q 30/02 (2023.01)

(52) U.S. Cl.
CPC ..... G06Q 30/0627 (2013.01); G06Q 30/0278 (2013.01)

(58) Field of Classification Search
CPC .. G06Q 50/01; G06Q 10/101; G06Q 30/0225; G06Q 30/0278; G06F 3/0482; G06F 3/0484; G06F 21/10; G06F 2221/0744; G06K 7/1413; G06K 19/06028

USPC .................................. 705/14.26, 21; 463/11
See application file for complete search history.

(56) References Cited

U.S. PATENT DOCUMENTS

| | | | |
|---|---|---|---|
| 10,603,569 B2 * | 3/2020 | Campaña Aguilera ...................... G06Q 10/0639 |
| 2004/0209691 A1 | 10/2004 | Roush |
| 2005/0038707 A1 * | 2/2005 | Roever ................ G06Q 20/202 705/21 |
| 2008/0227512 A1 * | 9/2008 | Lang ................... G07F 17/3293 463/11 |
| 2016/0147434 A1 | 5/2016 | Lee et al. |
| 2016/0361642 A1 * | 12/2016 | Linden ...................... A63F 1/02 |
| 2017/0213265 A1 * | 7/2017 | Masherah .......... H04N 1/00018 |

(Continued)

OTHER PUBLICATIONS

Invaluable, How to Determine Your Football Cards' Value, 2018 (Year: 2018).*

(Continued)

*Primary Examiner* — Tarek Elchanti
(74) *Attorney, Agent, or Firm* — DITTHAVONG, STEINER & MLOTKOWSKI

(57) ABSTRACT

An approach is provided for trading card platform. The approach involves, for example, initiating a reading of a machine readable code from a trading card to determine a card identifier. The approach also involves querying for one or more attribute data records associated with the trading card based on the card identifier. The approach further involves computing a value metric based on the one or more attribute data records and presenting a user interface displaying a digital representation of the trading card, the one or more sponsorship data records, the value metric, or a combination thereof.

19 Claims, 23 Drawing Sheets

300

301 — READ MACHINE READABLE CODE ASSOCIATED WITH TRADING CARD

303 — QUERY FOR ATTRIBUTE DATA RECORDS

305 — TRACK REDEMPTION OF ITEMS AND/OR SERVICES ASSOCIATED WITH SPONSORSHIP DATA RECORDS

307 — COMPUTE VALUE METRIC

309 — PRESENT USER INTERFACE DISPLAY DIGITAL REPRESENTATION OF TRADING CARD, SPONSORSHIP, AND/OR VALUE METRIC,

(56)  References Cited

U.S. PATENT DOCUMENTS

| 2018/0204060 | A1 |  | 7/2018 | Merchant et al. |
| 2020/0412831 | A1 |  | 12/2020 | Harrison et al. |
| 2023/0289696 | A1 | * | 9/2023 | Narechania ........... G06F 16/215 |

OTHER PUBLICATIONS

Adobe Express, "Trade cutome-made with Adobe Express", retrieved from http://www.adobe.com/express/create/trading-card, Apr. 20, 2021, 3 pages.
Lehman et al., "QR codes bring sports memorabilia to life in a spectacular way", Dec. 4, 2019, 6 pages.

* cited by examiner

801 DETERMINE CONTENT ASSOCIATED WITH

803 RETRIEVE CONTENT FROM CONTENT PROVIDERS

805 DISPLAY CONTENT IN USER INTERFACE

1000

1001 — PRESENT USER INTERFACE FOR SELECTING SUBJECT AND/OR ARTIST FOR A TRADING CARD

1003 — RECEIVE INPUT SELECTING SUBJECT AND/OR ARTIST

1005 — RECEIVE TRADE CARD ARTWORK/VISUAL DESIGN

1007 — PRESENT USER INTERFACE FOR APPROVAL OF ARTWORK/VISUAL DESIGN

1009 — OUTPUT APPROVED ARTWORK/VISUAL DESIGN FOR TRADING CARD PRODUCTION

Figure 13:
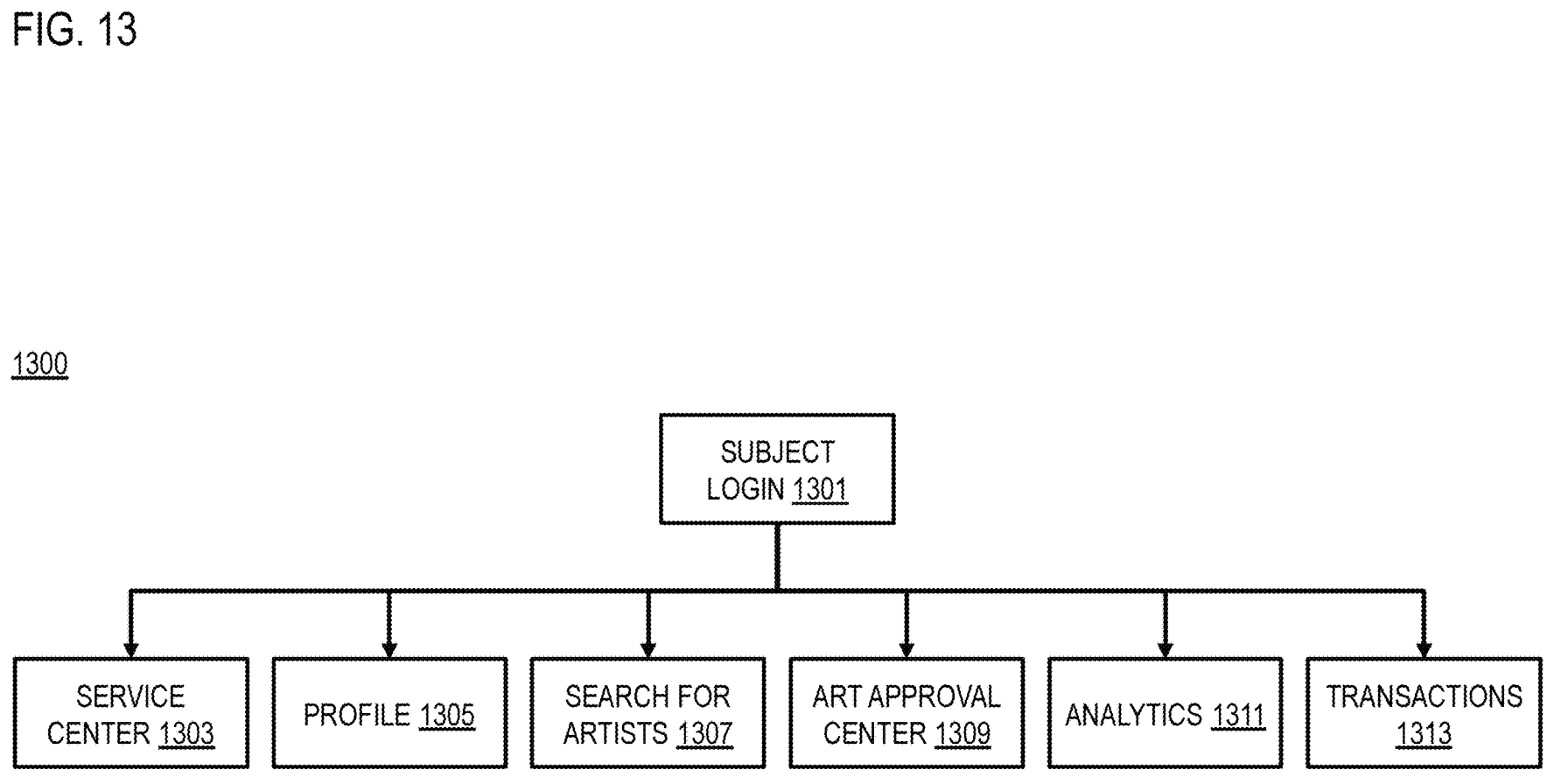

SUBJECT
LOGIN 1301

SERVICE
CENTER 1303

PROFILE 1305

SEARCH FOR
ARTISTS 1307

ART APPROVAL
CENTER 1309

ANALYTICS 1311

TRANSACTIONS
1313

Figure 14:
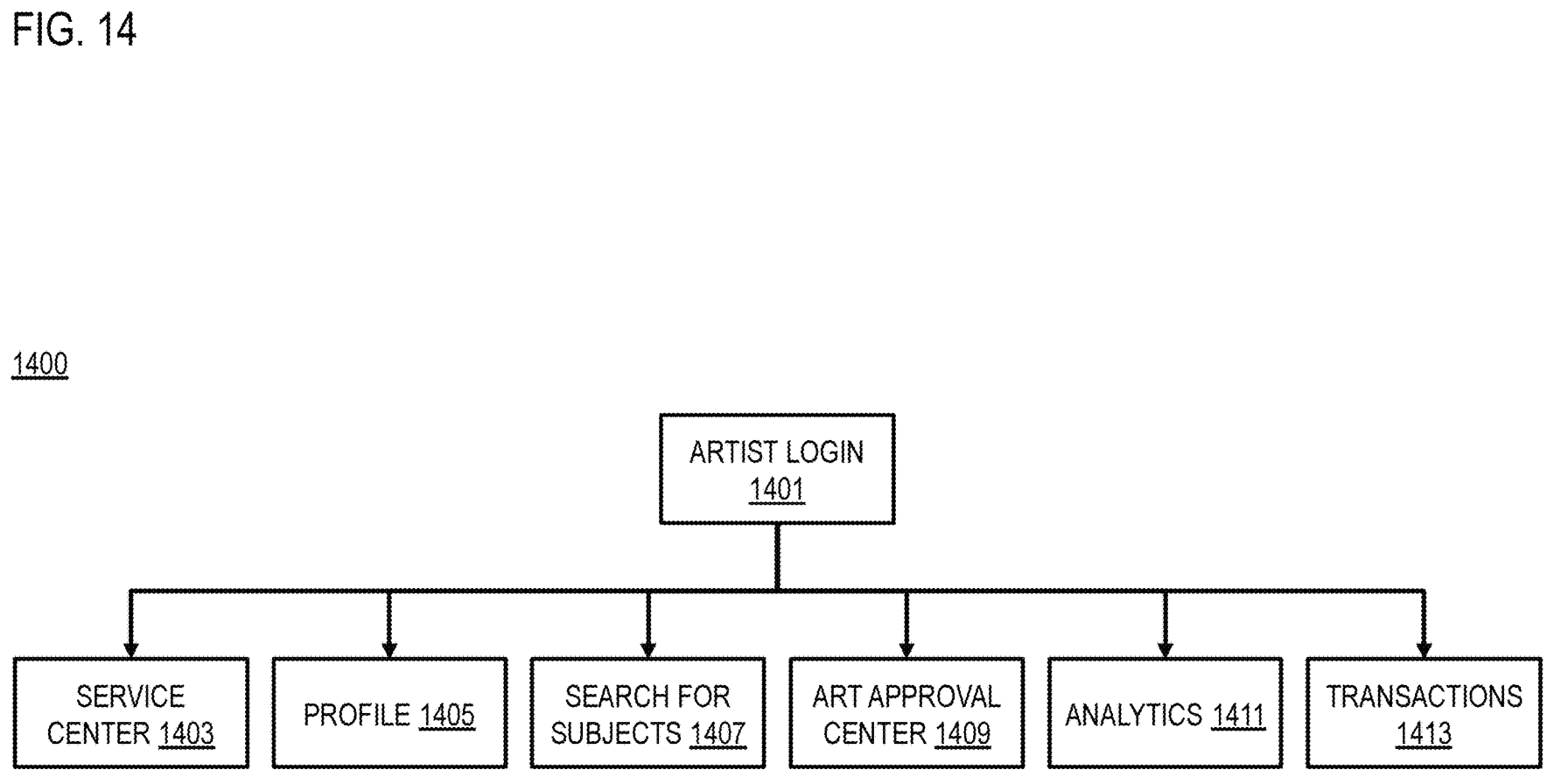

ARTIST LOGIN
1401

SERVICE CENTER 1403

PROFILE 1405

SEARCH FOR SUBJECTS 1407

ART APPROVAL CENTER 1409

ANALYTICS 1411

TRANSACTIONS
1413

1500

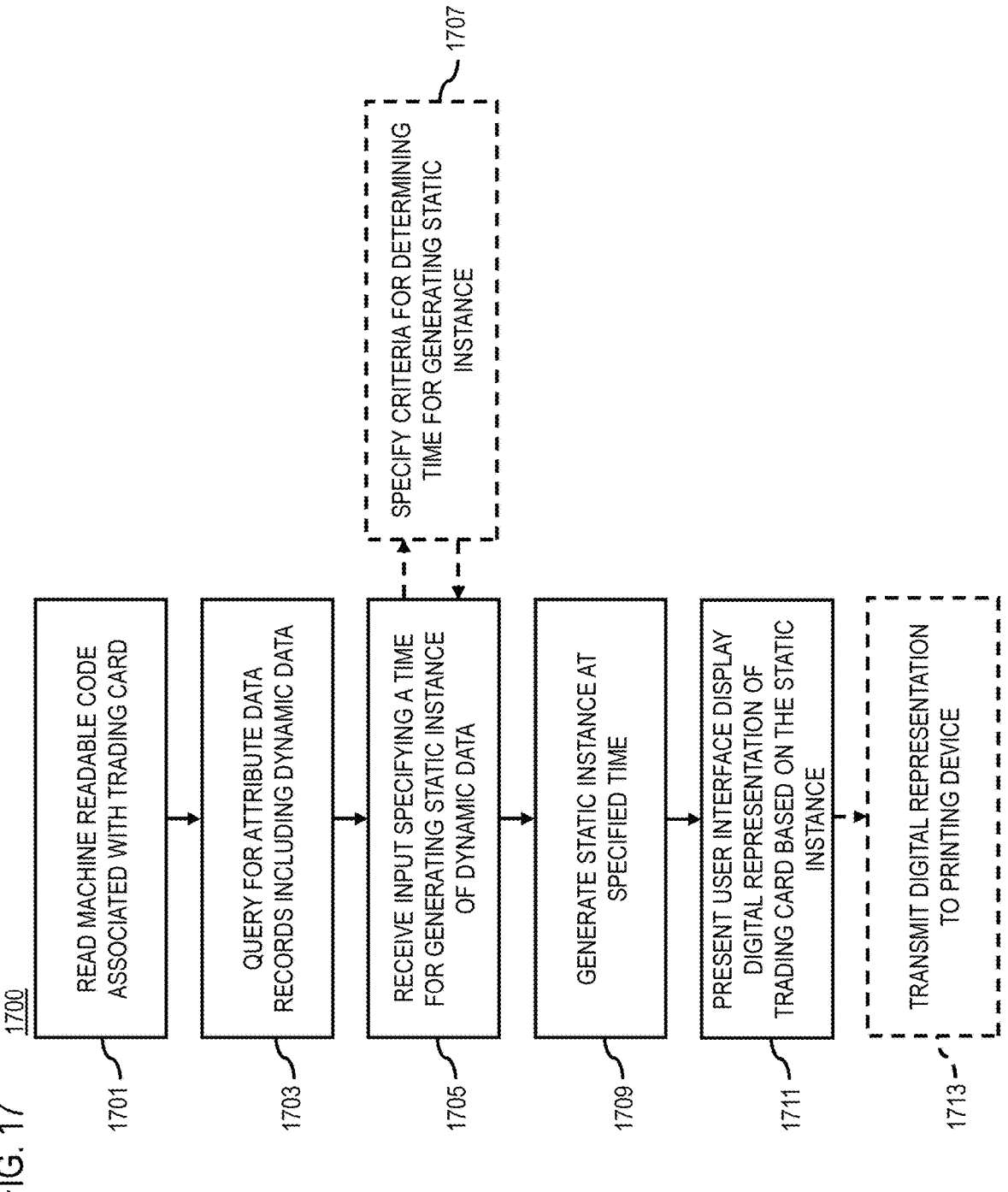

1701 — READ MACHINE READABLE CODE ASSOCIATED WITH TRADING CARD

1703 — QUERY FOR ATTRIBUTE DATA RECORDS INCLUDING DYNAMIC DATA

1705 — RECEIVE INPUT SPECIFYING A TIME FOR GENERATING STATIC INSTANCE OF DYNAMIC DATA

1707 — SPECIFY CRITERIA FOR DETERMINING TIME FOR GENERATING STATIC INSTANCE

1709 — GENERATE STATIC INSTANCE AT SPECIFIED TIME

1711 — PRESENT USER INTERFACE DISPLAY DIGITAL REPRESENTATION OF TRADING CARD BASED ON THE STATIC INSTANCE

1713 — TRANSMIT DIGITAL REPRESENTATION TO PRINTING DEVICE

2000

SYSTEM, METHOD, AND APPARATUS FOR A DIGITAL TRADING CARD PLATFORM

RELATED APPLICATION

This application is a continuation-in-part of and claims priority from U.S. application Ser. No. 17/946,745, entitled "System, Method, And Apparatus for a Digital Trading Card Platform," filed on Sep. 16, 2022, the contents of which are hereby incorporated herein in its entirety by this reference.

BACKGROUND

Traditionally, trading cards (e.g., sports trading cards or trading cards in any other domain) have been static with little engagement or interaction between the subjects (e.g., athletes) depicted in the trading cards and consumers of the trading cards. As a result, trading card providers face significant technical challenges with respect to integrating interactive technologies in the traditionally non-digital domain of trading cards.

SOME EXAMPLE EMBODIMENTS

Therefore, there is a need for a trading card platform that offers technical solutions to managing digital engagements and/or interactions between trading cards and associated stakeholders (e.g., athletes, other subject types depicted in the trading cards, artists designing the trading cards, consumers, sponsors, collectors, etc.).

According to one embodiment, a system comprises a trading card configured with a machine readable code. The system also comprises a code reader configured to read the machine readable code from the trading card to determine a card identifier. The system further comprises an apparatus configured to query for one or more attribute data records (e.g., attributes indicating sponsors, subjects, artists, etc.) associated with the trading card based on the card identifier and to compute a value metric based on the one or more attribute data records. The system further comprises an application configured to present a user interface displaying a digital representation of the trading card, the one or more attribute data records, the value metric, or a combination thereof. In one embodiment, the system further comprises determining content (e.g., broadcast content, streaming content, etc.) associated with the trading card, and then rendering the content within or otherwise associated with the digital representation of the trading card.

According to one embodiment, a method comprises initiating a reading of a machine readable code from a trading card to determine a card identifier. The method also comprises querying for one or more attribute data records associated with the trading card based on the card identifier. The method further comprises computing a value metric based on the one or more attribute data records. The method further comprises presenting a user interface displaying a digital representation of the trading card, the one or more attribute data records, the value metric, or a combination thereof. In one embodiment, the method further comprises determining content from one or more content providers associated with the trading card, retrieving the content from one or more content management systems of the one or more content providers, and displaying the content in the user interface (e.g., within or otherwise associated with the digital representation of the trading card in the user interface).

According to another embodiment, an apparatus comprises at least one processor, and at least one memory including computer program code for one or more computer programs, the at least one memory and the computer program code configured to, with the at least one processor, cause, at least in part, the apparatus to initiate a reading of a machine readable code from a trading card to determine a card identifier. The apparatus is also caused to query for one or more attribute data records associated with the trading card based on the card identifier. The apparatus is further caused to compute a value metric based on the one or more attribute data records. The apparatus is further caused to present a user interface displaying a digital representation of the trading card, the one or more attribute data records, the value metric, or a combination thereof. In one embodiment, the apparatus is further caused to determine content from one or more content providers associated with the trading card, retrieve the content from one or more content management systems of the one or more content providers, and display the content in a user interface (e.g., within or otherwise associated with the digital representation of the trading card in the user interface).

According to another embodiment, a non-transitory computer-readable storage medium carries one or more sequences of one or more instructions which, when executed by one or more processors, cause, at least in part, an apparatus to initiate a reading of a machine readable code from a trading card to determine a card identifier. The apparatus is also caused to query for one or more attribute data records associated with the trading card based on the card identifier. The apparatus is further caused to compute a value metric based on the one or more attribute data records. The apparatus is further caused to present a user interface displaying a digital representation of the trading card, the one or more attribute data records, a value metric, or a combination thereof. In one embodiment, the apparatus is further caused to determine content from one or more content providers associated with the trading card, retrieve the content from one or more content management systems of the one or more content providers, and display the content in a user interface (e.g., within or otherwise associated with the digital representation of the trading card in the user interface).

According to another embodiment, an apparatus comprises means for initiating a reading of a machine readable code from a trading card to determine a card identifier. The apparatus also comprises means for querying for one or more attribute data records associated with the trading card based on the card identifier. The apparatus further comprises means for computing a value metric based on the one or more attribute data records. The apparatus further comprises means for presenting a user interface displaying a digital representation of the trading card, the one or more attribute data records, the value metric, or a combination thereof. In one embodiment, the apparatus further comprises means for determining content from one or more content providers associated with the trading card, retrieving the content from one or more content management systems of the one or more content providers, and displaying the content in a user interface (e.g., within or otherwise associated with the digital representation of the trading card in the user interface).

According to one embodiment, a system comprises a trading card configured with a machine readable code. The system also comprises a code reader configured to read the machine readable code from the trading card to determine a card identifier. The system further comprises an apparatus configured to: query for one or more attribute data records associated with the trading card based on the card identifier, wherein the one or more attribute data records store dynamic data associated with the trading card; receive an input specifying a time or an event for generating a static instance of the dynamic data; and generate the static instance at the specified time or an occurrence of the event. The system further comprises an application configured to present a user interface displaying a digital representation of the trading card comprising a representation of the static instance.

According to one embodiment, a method comprises initiating a reading of a machine readable code from a trading card to determine a card identifier. The method also comprises querying for one or more attribute data records associated with the trading card based on the card identifier, wherein the one or more attribute data records store dynamic data associated with the trading card. The method further comprises receiving an input specifying a time or an event for generating a static instance of the dynamic data. The method further comprises generating the static instance at the specified time or an occurrence of the event. The method further comprises presenting a user interface displaying a digital representation of the trading card comprising a representation of the static instance).

According to another embodiment, an apparatus comprises at least one processor, and at least one memory including computer program code for one or more computer programs, the at least one memory and the computer program code configured to, with the at least one processor, cause, at least in part, the apparatus to initiate a reading of a machine readable code from a trading card to determine a card identifier. The apparatus is also caused to query for one or more attribute data records associated with the trading card based on the card identifier, wherein the one or more attribute data records store dynamic data associated with the trading card. The apparatus is further caused to receive an input specifying a time or an event for generating a static instance of the dynamic data. The apparatus is further caused to generate the static instance at the specified time or an occurrence of the event. The apparatus is further caused to present a user interface displaying a digital representation of the trading card comprising a representation of the static instance).

According to another embodiment, a non-transitory computer-readable storage medium carries one or more sequences of one or more instructions which, when executed by one or more processors, cause, at least in part, an apparatus to initiate a reading of a machine readable code from a trading card to determine a card identifier. The apparatus is also caused to query for one or more attribute data records associated with the trading card based on the card identifier, wherein the one or more attribute data records store dynamic data associated with the trading card. The apparatus is further caused to receive an input specifying a time or an event for generating a static instance of the dynamic data. The apparatus is further caused to generate the static instance at the specified time or an occurrence of the event. The apparatus is further caused to present a user interface displaying a digital representation of the trading card comprising a representation of the static instance).

According to another embodiment, a system comprises a trading card configured with a machine readable code. The system also comprises a code reader configured to read the machine readable code from the trading card to determine a card identifier. The system further comprises an apparatus configured to query for one or more attribute data records associated with the trading card based on the card identifier and to compute a value metric based on the one or more attribute data, wherein the one or more attribute data records include one or more sponsorship data records. The system further comprises an application configured to present a user interface displaying a digital representation of the trading card comprising the one or more attribute data records, the value metric, or a combination thereof. an apparatus configured to: query for one or more attribute data records associated with the trading card based on the card identifier, wherein the one or more attribute data records store dynamic data associated with a subject, an artist, or a combination thereof of the trading card; receive an input specifying a time or event for generating a static instance of the dynamic data; and generate the static instance at the specified time or occurrence of the event. The system further comprises an application configured to present a user interface displaying a digital representation of the trading card comprising a representation of the static instance.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a time-sequence diagram that illustrates a sequence of messages and processes between system components for computing a value metric for a trading card, according to one example embodiment;

FIG. 13 is a diagram of a process flow for a subject to interact with a trading card platform, according to one example embodiment;

FIG. 14 is a diagram of a process flow for an artist to interact with a trading card platform, according to one example embodiment;

FIG. 17 is a flowchart of a process for freezing dynamic attributes of a trading card, according to one example embodiment;

DESCRIPTION OF SOME EMBODIMENTS

Examples of a system, method, and apparatus for providing a digital trading card platform are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one example embodiment," "one embodiment," or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
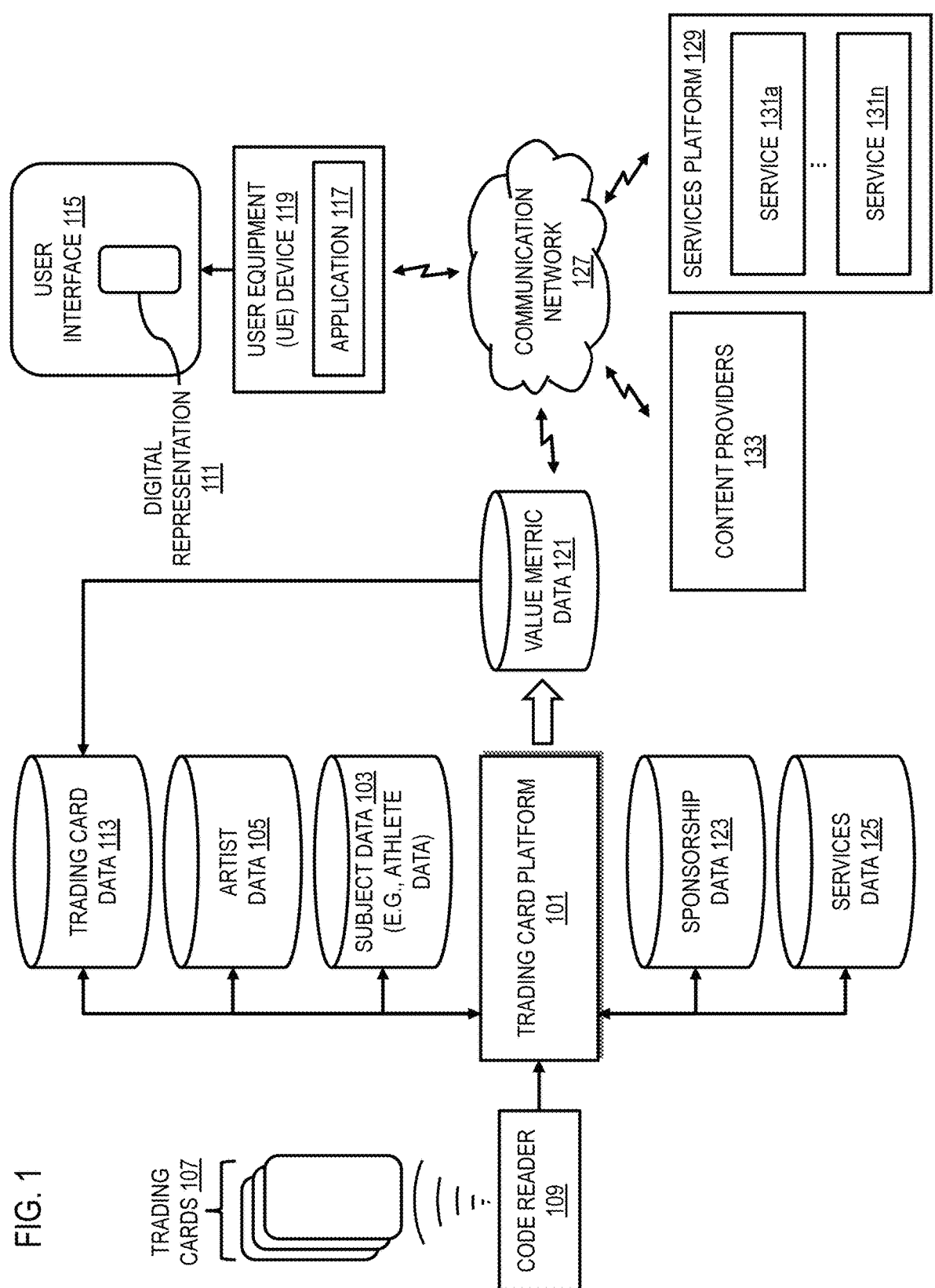
FIG. 1 is a diagram of a system capable of providing a digital trading card platform, according to one example embodiment.

FIG. 1 is a diagram of a system 100 capable of providing a digital trading card platform, according to one example embodiment. Trading cards have been produced for different subjects including but not limited to inanimate or animate subjects, things, places, people vehicles, animals, paintings, etc. Historically trading cards have been produced mainly for high profile subjects or athletes. This is because one of the primary drivers of value of a trading card is for example the athlete's career and popularity—i.e., the better or more popular the athlete or player, the better the value of the athlete's trading card or separately associated merchandising or sponsorship deals for the athlete. However, recent changes in policy and laws with respect to college athletes' being able to benefit from their name, image, and likeness (NIL) opens up the opportunity for many more in particular athletes to explore trading card and/or related sponsorship deals. For example, the National Collegiate Athletic Association (NCAA) NIL policy in part provides the following guidance:

Individuals can engage in ML activities that are consistent with the law of the state where the school is located. Colleges and universities are responsible for determining whether those activities are consistent with state law.

College athletes who attend a school in a state without an NIL law can engage in this type of activity without violating NCAA rules related to name, image, and likeness.

Individuals can use a professional services provider for NIL activities.

Student-athletes should report NIL activities consistent with state law or school and conference requirements to their school."

Thus, with this change in ML policy many more athletes (e.g., NCAA athletes) are eligible to benefit from ML likeness opportunities including trading card deals and/or related sponsorships. However, because these athletes are now eligible for ML deals does not mean the opportunities are also easier to get. For example, lesser known athletes may still find it difficult to discover available NIL sponsorships and how to obtain them. Conversely, potential sponsors (e.g., corporations) may find it difficult to discover what athletes are available for them to sponsor. In either case, keeping track of the NIL deals and sponsorship for reporting requirements can also be difficult.

In addition, potential consumers who want to buy, sell, and/or trade these cards may find it difficult to determine or estimate the values of trading cards, particularly as the variety and number of subjects expands. Traditionally, consumers would have to look to the marketplace to see how much comparable cards have previously sold or traded for. But this traditional process is fraught with uncertainty.

Accordingly, a service provider who seeks to provide technical solutions to making trading card values, related sponsorships, or NIL opportunities more easily accessible to athletes, consumers, and/or other stakeholders face significant technical challenges. There are also technical challenges with the scenario of making athletes or other subjects more easily accessible to potential sponsors. By way of example, these technical challenges include but are not limited to providing a unique user experience and interactive platform that comprehensively addresses the problems and issues described above.

In one embodiment, to address these technical challenges, the system 100 of FIG. 1 introduces a trading card platform 101 with the capability to enable one or more subjects/athletes (e.g., listed in a database of subject data 103) to be matched with one or more artists (e.g., represented in a database of artist data 105) to create one or more trading cards 107 (e.g., physical and/or digital trading cards) which serve as digital gateways to sponsorship (e.g., NIL) opportunities.

It is noted that as used herein, the term "subject" refers to any person, object, thing, place, etc. that can be depicted on a card including but not limited to an athlete. Accordingly, although the various embodiments described herein may refer to an athlete as one example of a subject, it is contemplated wherever the description refers to athlete, the description can also apply to any subject in general. Other examples of a subject include but are not limited to collectible objects (e.g., cars), pets, people in different professions, etc. The attributes associated with the subject (e.g., used to compute a value metric for the card) can also vary with the subject. For example, athletes and cars can include performance statistics, while animals may have attributes indicating breed, age, etc.

In one embodiment, the trading cards 107 are created with a card identifier that is encoded as a machine readable code (e.g., bar code, quick response (QR) code, near field communication (NFC), Bluetooth beacon, etc.). The machine readable code can be read using a code reader 109 (e.g., a barcode reader, etc.). The trading card platform 101 then uses the card identifier to associate a trading card 107 with its corresponding digital representation 111 (e.g., stored in a database of trading card data 113). The digital representation 111 is displayable in a user interface 115 generated by an application 117 (e.g., a client application to the trading card platform 101) executing on a user equipment (UE) device 119 (e.g., smartphone, tablet, computer, wearable device, etc.).

In one embodiment, the trading card platform 101 also uses the card identifier determined from a trading card 107 to query for one or more parameters or attributes (e.g., promotional items provide free or at a discount with the trading card 107, attributes of the subject of the trading card 107, attributes of an artist that created the artwork for the trading card 107) that can be used to compute the value metric data 121 for the trading card 107. The value metric data 121, for instance, represents a computed value of the trading card 107 and can be expressed using any metric such as but not limited to a monetary value, value ranges (e.g., low, medium, high, etc.), and/or any other equivalent scale or metric. In one embodiment, the value metric can be based on any attribute queried from any of the data sources available to the trading card platform 101 including but not limited to the subject data 103 (e.g., storing one or more attributes of the subject depicted on the trading card 107—such as performance statistics, affiliations, etc.), artist data 105 (e.g., storing one or more attributes of the artist that created the artwork for the trading card 107), sponsorship data 123 (e.g., storing data records of sponsorships associated with the trading card 107 and/or subject), services data 125 (e.g., storing data indicated services included with or otherwise provided by the trading card 107), trading card data 113 (e.g., storing data associated with the digital representation 111 of the trading card 107), etc. The data records in the various embodiments of the data sources of the system 100 are collectively referred to herein as attribute data records.

For example, the trading card platform 101 can query sponsorship data 123 for any sponsorship data records that indicate the availability of redeemable items or services associated with the trading card 107. For example, one or more sponsors may have agreed to provide promotional items that are free or provided at a discount to the owner of the trading card 107. The value of these promotional items can be at least one parameter in computing the value metric of the corresponding trading card 107.

Similarly, in one embodiment, the trading card 107 may include one or more services (e.g., a call, text, social media post, video, meet and greet, autograph, etc. with the subject of the trading card 107) that are to be provided to the owner of the trading card 107. The data records indicating these services can be queried from the services data 125 using the card identifier. In one embodiment, the value metric data 121 of the trading card 107 can be further computed based on the availability of the services. By way of example, the services can be performed or verified to have been performed over communication network 127 via a services platform 129 comprising one or more services 131*a*-131*n* (collectively referred to as services 131) such as social media services, shopping services, and/or the like. For example, if a service involves the subject posting a social media message, verification of the posting of the message on a social media service (e.g., service 131) can be used to confirm that the service associated with the trading card 107 has been performed.

In one embodiment, the trading card 107 may include access to content (e.g., video content, audio content, etc.). One example of the content includes promotional videos of the subject. Other examples, include programming content, broadcasting content, streaming content, etc. provided by one or more content providers 133 (e.g., over communication network 127). The content provided by the one or more content providers 133 can include paid content, subscriptions, content restricted to owners of the trading card 107, pay-per-view content, etc. that are provided free or at a discounted rate. In this case, the card identifier or any other authentication mechanism can be used to determine access rights to the content. In one embodiment, the content can be streamed and displayed in the user interface 115 as part of the digital representation 111 of the trading card 107. For example, the content can be rendered in UI element within the rendered digital representation 111. In one embodiment, the value metric data 121 associated with the trading card 107 can be computed further based on the availability of the content from the content providers 133.

In one embodiment, a value metric data 121 of a trading card 107 can also be based on attributes of the subject and/or the artist associated with the trading card 107. For example, the trading card platform 101 can query for subject data 103 indicating one or more attributes of the subject (e.g., popularity, career, etc.). In use cases where the subject is an athlete, the subject data 103 can include but is not limited to sports statistics, affiliated teams/organizations, conference, division, playing position, etc. Similarly, the trading card platform 101 can query for artist data 105 indicating one or more attributes of the artist responsible for the artwork or visual design of the trading card 107. Example of artist attributes include but is not limited to popularity, experience, artistic portfolio, style, previously sold artwork, etc. The trading card platform 101 can then compute the value metric data 121 for the trading card 107 further based on the attributes of the associated subject and/or artist.

In yet another embodiment, the value metric data 121 can also be based on ownership of a suite or combination of trading cards 107. For example, collecting a designated set of trading cards 107 (e.g., trading cards 107 from all members of a team) as a single collection can create a bonus value over the individual value metrics of each trading card 107 in the collection. It is contemplated that an individual trading card 107 can be designated as a part of any number of suites or collections. For example, a trading card 107 can be part of a team suite, a sport suite, a suite of all cards depicting the same subject, a suite of cards for the same artist, etc. The suite or combination of trading cards 107, for instance, can be designated and stored in the trading card data 113.

Figure 2B:
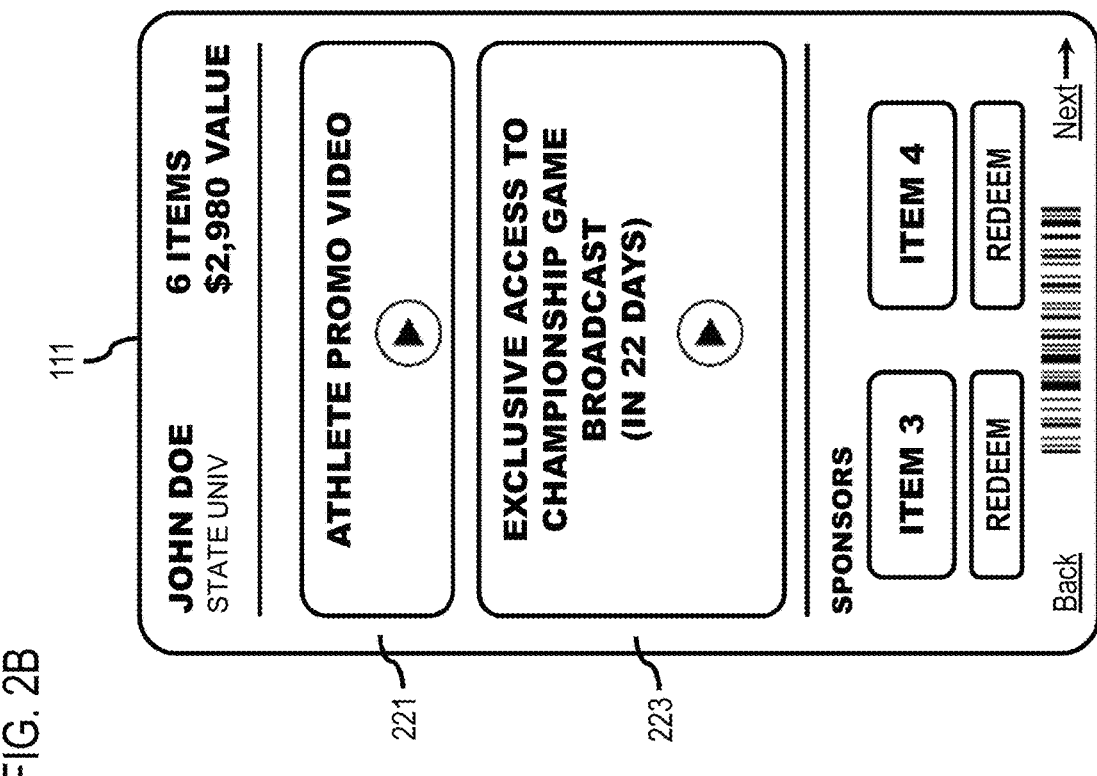
FIGS. 2A-2C are diagrams illustrating examples of a digital representation of a trading card, according to one example embodiment.
Figure 2A:
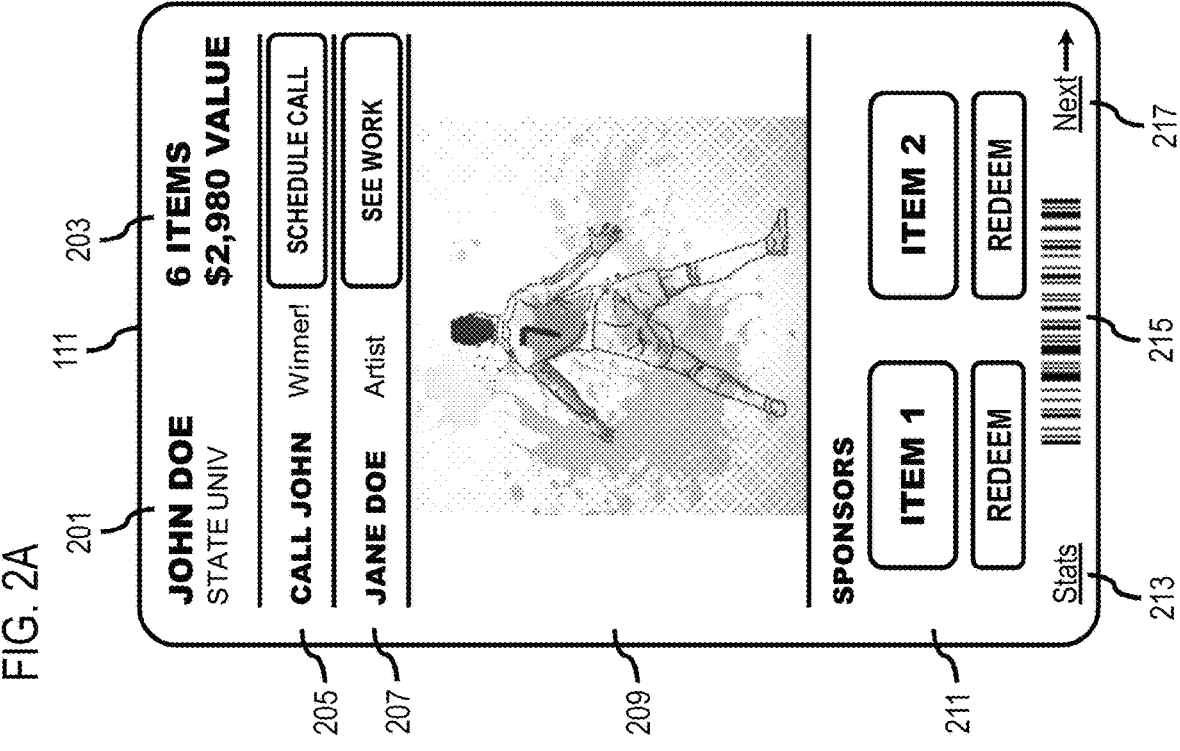
Figure 2C:
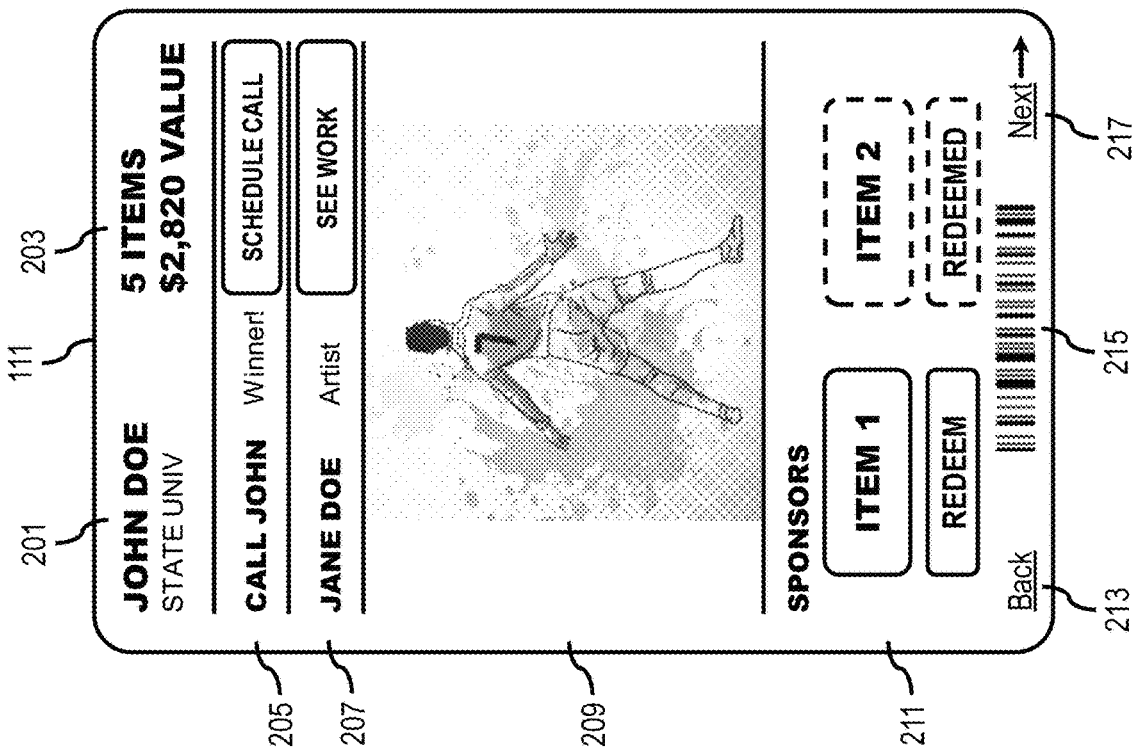

In one embodiment, the value metric data 121, subject data 103, artist data 105, trading card data 113, sponsorship data 123, services data 125, and/or content from content providers 133 associated with the trading card 107 can be aggregated and presented in the digital representation 111 of the trading card 107 as shown in the examples of FIGS. 2A-2C.

FIGS. 2A-2C are diagrams illustrating examples of a digital representation 111 of a trading card 107, according to one example embodiment. In the example of FIG. 2A, a first page of the digital representation 111 is illustrated. The digital representation 111 can be rendered in a user interface (UI) 115 of a user equipment (UE) device 119 via an application 117. The digital representation 111 includes, for instance:

a UI element 201 displaying information on the subject such the subject's name (e.g., athlete "John Doe") and affiliated school (e.g., "State Univ") (e.g., queried from subject data 103);

a UI element 203 displaying the number of associated promotional items (e.g., queried from the sponsorship data 123) and the value metric data 121 (e.g., computed for the trading card 107 according to the various embodiments described herein);

a UI element 205 displaying a service (e.g., a personal call from the subject) that is included with the trading card 107 (e.g., queried from the services data 125);

a UI element 207 displaying information on the artist responsible for the artwork or visual design of the trading card 107 (e.g., quired from the artist data 105);

a UI element 209 displaying the artwork or visual design created by the artist specified in UI element 207 (e.g., queried from the trading card data 113 and/or artist data 105);

a UI element 211 displaying the promotional items (e.g., provided by one or more sponsors) that are included with the trading card 107 and controls for redeeming the items (e.g., queried from the sponsorship data 123);

a UI element 213 linking to the sports statistics of the subject (e.g., queried from the subject data 103 and/or one or more third party statistics providers such as a service 131 of the services platform 129);

a UI element 215 displaying a barcode (or equivalent machine readable code) that encodes a card identifier to link the digital representation 111 to the physical and/or digital trading card 107 (e.g., queried from the trading card data 113); and a UI element 217 displaying a navigation control element to display a subsequent view of the card, thereby enabling the digital representation 111 to comprise multiple pages within a single digital representation 111 depending on the trading card design or available card data (e.g., queried from the trading card data 113).

FIG. 2B illustrates an example second page of the digital representation 111 of FIG. 2A. In this example, in addition to common UI elements shared with the first page of the digital representation 111 shown in FIG. 2A, the second page of the digital representation 111 includes, for instance:

a UI element 221 for displaying a promotional video (or other media) related to the subject and providing media controls for controlling playback of the content from the UI element 221 itself (e.g., queried from the subject data 103 and/or content providers 133); and a UI element 223 for displaying content available from one or more content providers 133 and providing media controls for controlling playback of the content from the UI element 223 itself (e.g., as a sponsored placement of the content in the digital representation 111 of the trading card 107 with examples including but not limited to broadcast programming, streaming services, video on demand services, pay-per-view services, and/ or the like) (e.g., queried from the sponsorship data 123 and/or content providers 133).

FIG. 2C illustrates an example use of an interactive element of the digital representation 111 as shown in FIG. 2A, according to one example embodiment. In this example, a consumer of the trading card 107 interacts with the digital representation to redeem promotional item 2 listed UI element 211. The consumer, for instance, clicks on the redeem option depicted under the representation of promotion item 2 to initiate the redemption. One example embodiment of the redemption process is described in further detail with respect to FIG. 5 below. On confirmation of the redemption of the requested item (e.g., promotional item 2), UI element 211 of the digital representation 111 can be updated to visually indicate that the listed item 2 has been redeemed. In one embodiment, the visual indication can include but is not limited to the changing the rendered appearance of the item 2 (e.g., by rendering item 2 with a dashed line versus a solid line as shown). In addition, the trading card platform 101 can update the corresponding value metric 121 and sponsorship data 123 to indicate the redemption and render the updated information in UI element 203. For example, as shown, UI element 203 has been updated to indicate a "5 Items" versus the original "6 Items" remaining, and a new value metric from of "$2,820" versus the original "$2,980."

It is noted that the examples of a digital representation 111 of a trading card 107 described with respect to the FIGS. 2A-2C are provided by way of illustration and not as limitations. It is contemplated that any one or more of the illustrated UI elements may combined, eliminated, or rendered in any arrangement or configuration.

In one embodiment, one or more of the components of the system 100 may be implemented as a cloud-based service, local service, native application, or combination thereof. The functions of the system 100 and its components are discussed with respect to figures below.

Figure 3:
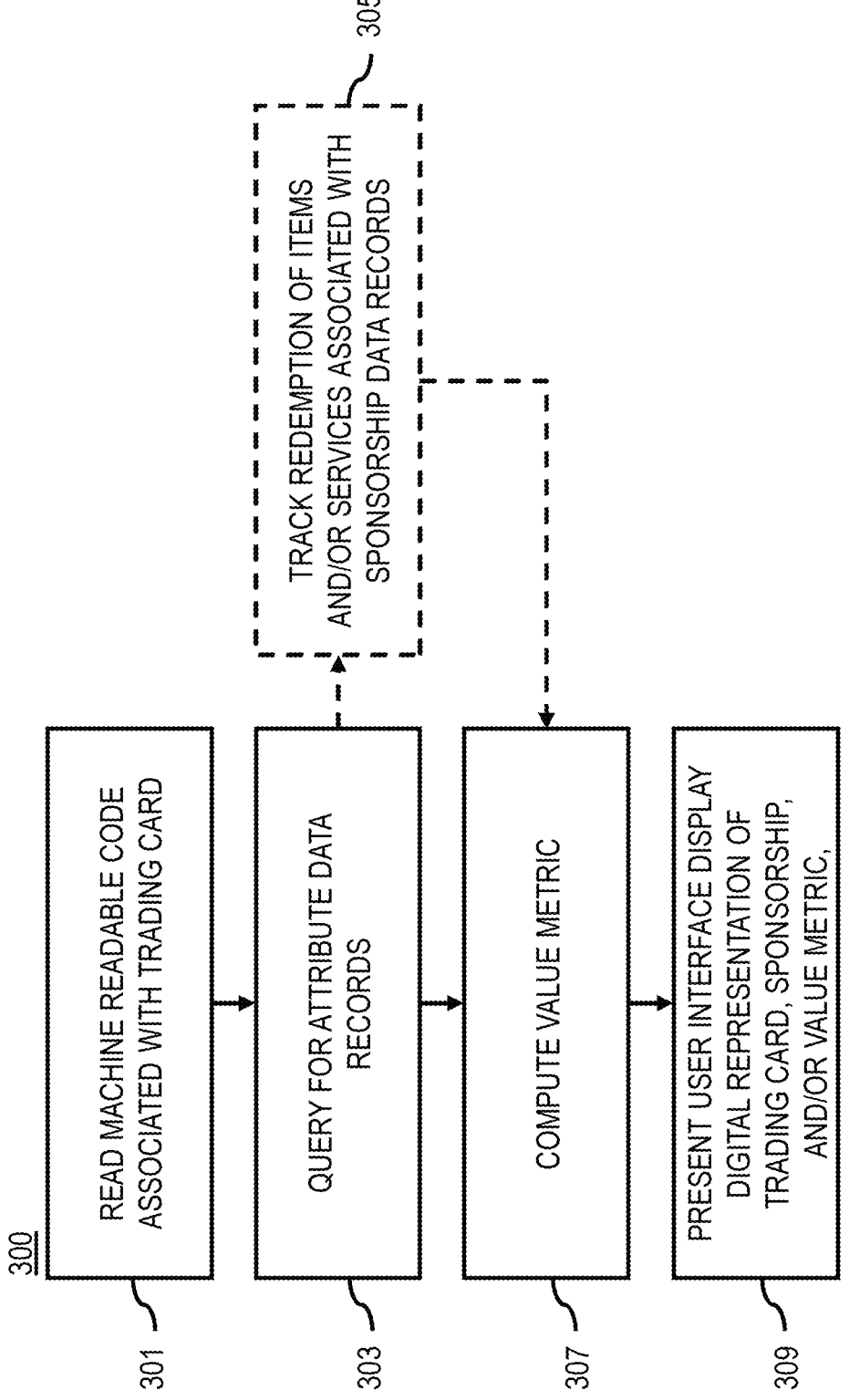
FIG. 3 is a flowchart of a process for presenting a digital representation of a trading card, according to one example embodiment.
Figure 20:
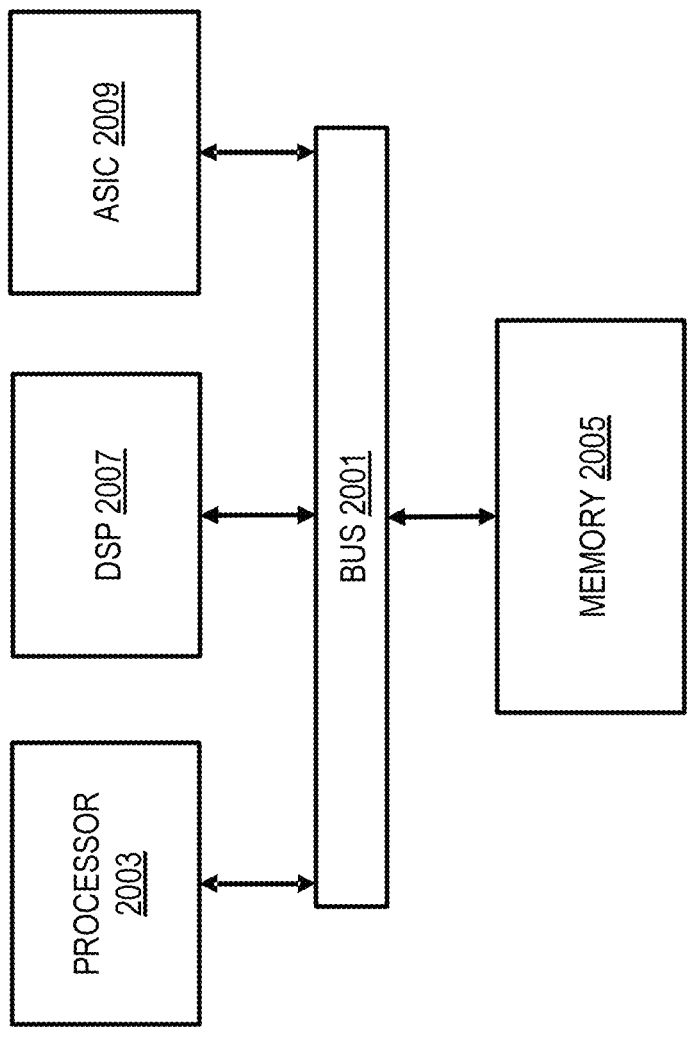
FIG. 20 is a diagram of a chip set that can be used to implement an example embodiment of the processes described herein.

FIG. 3 is a flowchart of a process 300 for presenting a digital representation of a trading card 107, according to one example embodiment. In various example embodiments, the trading card platform 101 alone or in combination with the application 117 may perform one or more portions of a process 300 and may be implemented in/by various means, for instance, a chip set including a processor and a memory as shown in FIG. 20 or in a circuitry, hardware, firmware, software, or in any combination thereof. In one example embodiment, the circuitry includes but is not limited to processing circuitry, code reading circuitry, and output circuitry. As such, the system 100, trading card platform 101, application 117, and/or any associated apparatus, device, circuitry, system, computer program product, and/or non-transitory computer readable medium can provide means for accomplishing various parts of the process 300, as well as means for accomplishing embodiments of other processes described herein. Although the process 300 is illustrated and described as a sequence of steps, it is contemplated that various embodiments of the process 300 may be performed in any order or combination and need not include all of the illustrated steps.

In one embodiment, the process 300 assumes that a trading card 107 configured with a machine readable code has been created to include the characteristics and elements of a trading card 107 discussed with respect to the various embodiments described herein. For example, the trading card 107 can depict or otherwise include, at a minimum, a barcode or other machine readable code (e.g., QR code, NFC, etc.). The machine readable code, for instance, encodes a card identifier that can be processed by the trading card platform 101. In addition to the machine readable code, the trading card 107 can include all or a portion of the of the elements described with respect to embodiments the digital representation 111 described with respect to FIGS. 2A-2C.

In one embodiment, the trading card 107 can be a physical and or digital/electronic trading card that, for instance, can be linked or otherwise registered to a corresponding digital representation 111 of the trading card 107 stored by the trading card platform 101 (e.g., in trading card data 113 or equivalent database). One example of digital trading card 107 includes but is not limited to a non-fungible token (NFT) that tracks the ownership and any related sponsorship/promotional contracts as smart contracts on a blockchain (e.g., maintained via the Ethereum network or other equivalent blockchain or cryptocurrency network). In one embodiment, the visual design of the digital trading card 107 can mirror all or a portion of the digital representation 111. In some embodiments, the digital representation 111 can be the digital or electronic version of the trading card 107.

Then, in step 301, a code reader 109 can read or be configured to read the machine readable code from the trading card 107 to determine a card identifier. In one embodiment, the code reader can be a standalone code reader 109 (e.g., bar code reading apparatus or equivalent) or a component of the UE 119 (e.g., a camera sensor capable of scanning, NFC module, Bluetooth module, etc.). The card identifier can be any identifier that can be used to match the trading card 107 to a respective digital representation 111. In one embodiment, the card identifier can be unique to individual trading cards 107, a series of trading cards 107 (e.g., associated with a team, organization, sport, and/or any other category of cards), trading cards 107 specific to subject, trading cards 107 specific to an artist, trading cards 107 specific to an artistic style, etc.

In step 303, an apparatus (e.g., the trading card platform 101, application 117, and/or any associated device, system, or platform) queries or is configured to query for one or more attribute data records (e.g., any of the subject data 103, artist data 105, trading card data 113, sponsorship data 123, service data 123, content from content providers 133, etc.) associated with the trading card 107 based on the card identifier. As an example, sponsorship data 123 are data records indicating any sponsorship deals that are associated with the trading card 107 or the subject of the trading card 107 including but not limited to promotional items provided by corporations or other sponsors to an owner or bearer of the trading card 107. Promotional items include but are not limited to items that are provided for free or at a discount.

With respect to sponsorship data 123, in optional step 305, the one or more sponsorship data records are associated with one or more redeemable items, one or more redeemable services, or a combination thereof. In this case, the apparatus is further configured to track a redemption of the one or more redeemable items, the one or more redeemable services, or a combination thereof. Example embodiments of this tracking and redemption process is described in more detail with respect to FIG. 5 below. In one embodiment, the value metric 121 associated with trading card 107 can vary as the promotional items associated with the trading card 107 are redeemed. In other embodiments, new or equivalent promotional items can be used to replenish the trading card 107 as one owner redeems those items so that the same, or subsequent owners can also benefit from the same or equivalent promotional items. In this way, the value metric 121 of a trading card 107 can remain stable between different owners (e.g., when the card is sold or traded) regardless of whether one or more associated promotional items have been redeemed.

In step 307, the apparatus is further configured to compute a value metric 121 based, at least in part, on the one or more attribute data records (e.g., sponsorship data 123 and/or any of attributes of the data sources of the system 100). In one embodiment, the value metric 121 is an indicator of or otherwise represents a value of the card to an owner or bearer of the trading card 107 based on the attributes (e.g., sponsorships, subject attributes, artist attributes, etc.) associated with the trading card 107 (e.g., sponsorships associated with the subject/athlete as well as the artist responsible for the artwork or visual design depicted in the trading card 107 and/or its digital representation 111.

As discussed above, in one embodiment, the apparatus is further configured to update the value metric 121 based on changes to the attributes (e.g., the redemption of the one or more redeemable items, the one or more redeemable services, or a combination thereof) associated with the trading card 107. In one embodiment, the one or more redeemable services includes a subject of the trading card 107 performing a task (e.g., autograph, text, call, voice message, social post, create a video, live video, take a picture, meet and greet, and/or the like). In cases where a service is to be performed via a service 131 (e.g., social media service or network) of a services platform 129 (e.g., a social post on a social media service), the apparatus is further configured to query the social media platform (e.g., services platform 129 and/or services 131) to determine a completion of the task. Then, the redemption is tracked based on the completion of the task. For example, the determining of the completion of the task comprises querying social media platform (e.g., via an application programming interface (API) or equivalent) for a social media post by the subject with the requested content (e.g., by querying and identifying key words, dates, etc. in the social media post, or performing a machine learning-based analysis of the post to determine whether the request message parameters are present).

In one embodiment, the trading card 107 depicts a subject (e.g., an athlete). Then, the apparatus is further configured to query for one or more subject attribute data records (e.g., subject data 103) indicating one or more attributes of the subject. The trading card platform 101 can then compute the value metric 121 further based on the one or more subject attribute data records. In an example use case in which the subject is an athlete, the one or more attributes of the subject can include one or more sports statistics, one or more sports organization affiliations, or a combination thereof. The value metric 121 can then be based on the subject and/or sports attributes (e.g., increasing the value metric 121 based on a popularity of the subject, the subject's sport, the subject's performance statistics, etc.).

In one embodiment, the trading card 107 is associated with an artist that creates or has created artwork or a visual design of the trading card 107. In this embodiment, the apparatus is further configured to query for one or more artist attribute data records (e.g., artist data 105) indicating one or more attributes of the artist. The apparatus is then configured to compute the value metric 121 further based on the one or more artist attribute data records. For example, similar to the subject-based changes to the value metric 121, the value metric 121 can be based on the artist and the artist's associated attributes (e.g., increasing the value metric 121 based on a popularity of the artist, the artist's work, the artist's style, the artist's organizational/school affiliations, etc.).

Example processes for determining the value metric based on, for instance, the sponsorship data 123, services data 125, subject data 103, artist data 105, content available from content providers 133, or a combination thereof is discussed in more detail with respect to FIG. 4 below.

In step 309, an application (e.g., application 117 alone or in combination with the trading card platform 101) presents or is otherwise configured to present a user interface 115 displaying, at least in part, a digital representation 111 of the trading card 107, the one or more sponsorship data records, the value metric 121, or a combination thereof. Examples of the digital representation 111 are discussed in the various embodiments of the FIGS. 2A-2C above. In other words, an intrinsic value of the trading card 107 is computed based, at least in part, on the value of the promotional or sponsorship items included with the card and then presented in the user interface 115 comprising the digital representation 111. As used herein, the term "intrinsic value" is the value of the trading card 107 based on the promotional items included with the trading card 107. In various embodiments, this intrinsic value (e.g., the value metric 121) can be further modified based on the services data 125, subject data 103, artist data 105, content included with the trading card 107 from content providers 133, or a combination thereof.

In one embodiment, the value metric 121 is dynamic. Thus, the trading card platform 101 and/or application 117 can monitor for changes in any of the underlying data sources used to compute the value metric 121 (e.g., sponsorship data 123, services data 125, subject data 103, artist data 105, content available from content providers 133, or a combination thereof) and updates the value metric 121 accordingly. The application is then further configured to display the updated value metric in the user interface 115 as changes in value occur. In some embodiments, alerts based on changes to the metric can be set. For example, a consumer can set an alert to indicate when the value metric 121 for a given card increases or decreases by more than a threshold value, or reaches a predetermined target value, and/or the like.

Figure 4:
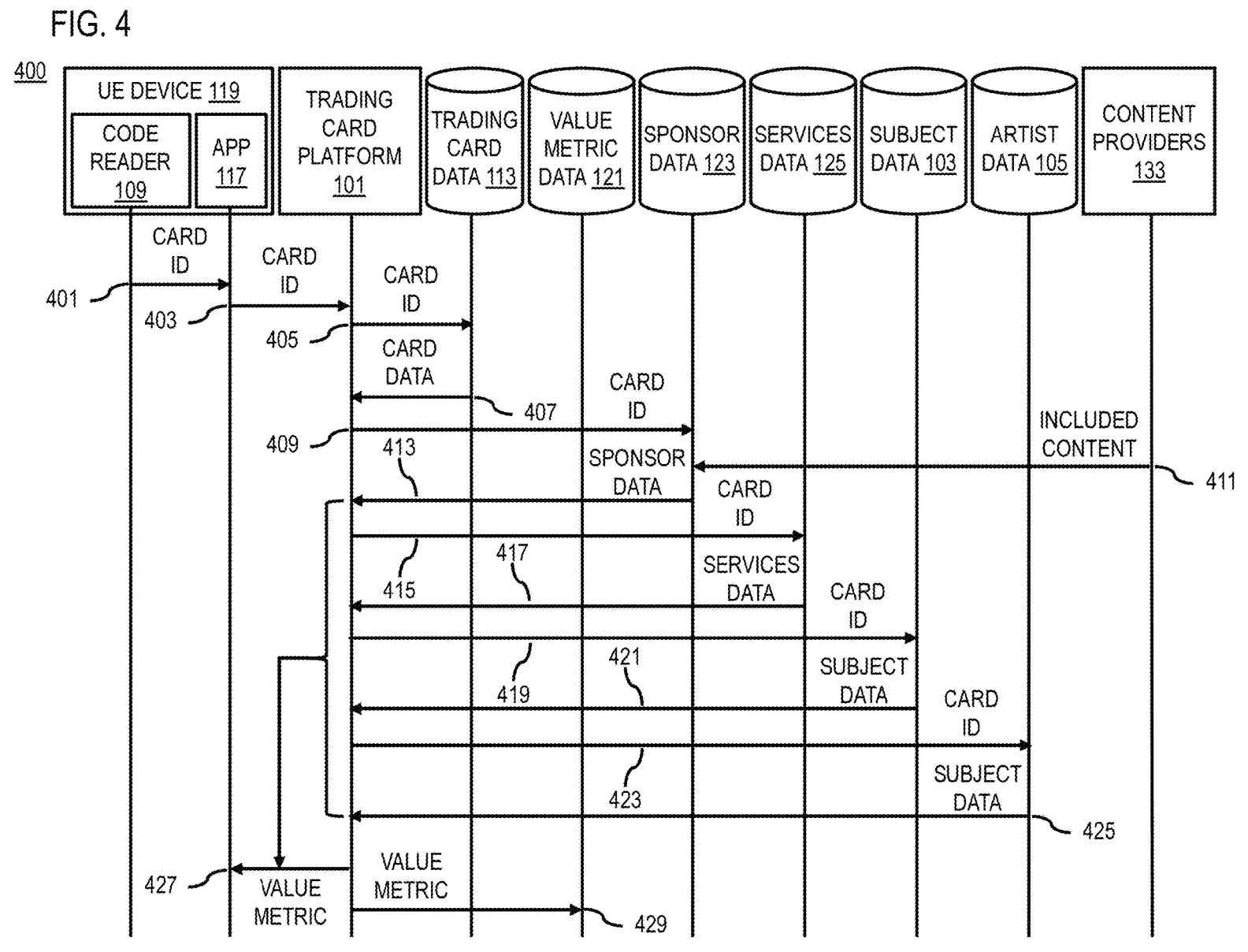

FIG. 4 is a time-sequence diagram 400 that illustrates a sequence of messages and processes between system components for computing a value metric 121 for a trading card 107, according to one example embodiment. A message that is passed from one process to another is represented by horizontal arrows. The processes represented in FIG. 4 are a UE 119 associated with a code reader 109 and application 117, the trading card platform 101, trading card data 113, value metric data 121, sponsorship data 123, services data 125, subject data 103, artist data 105, and content providers 133.

In one embodiment, the time-sequence diagram 400 starts with the code reader 109 (e.g., associated with UE 119) determining a card identifier associated with a trading card 107 of interest. As described previously, the machine readable code can be associated with the trading card 107 in any format (e.g., barcode, QR code, NFC, etc.). In some embodiments, the trading card 107 need not have a machine readable code. Instead, the code reader 109 can use computer vision to detect visual features of the trading card 107 and encode the detected visual features in a feature vector. This feature vector can then represent or otherwise be used to derive the card identifier that can be processed by the trading card platform 101. In many cases, the feature vector will be unique to the trading card 107 because the card's visual features are also likely to be unique.

For example, the code reader 109 can capture an image of the trading card 107 and then use one or more machine learning means (e.g., one or more neural networks such as but not limited to a deep neural network (DNN), convolutional neural network (CNN), You Only Look Once (YOLO) network, and/or equivalent) to detect the visual features of the card. The feature vector representing the visual features can be output directly from the machine learning means or otherwise extracted from a layer of the neural network (e.g., last layer before the output layer). Regardless of whether the card identifier is read from the machine readable code or determine using machine learning means, the code read 119 can send the card identifier to the application 117 (e.g., a trading card platform 101 client) executing on the UE 119 (e.g., via message 401). The application 117 then generates a trading card request to forward the card identifier to the trading card platform 101 (e.g., via message 403).

Next, the trading card platform 101 uses the card identifier to query the trading card data 113 for data on the digital representation 111 associated with the trading card 107 of interest (e.g., via message 405). Data on the digital representation 111 can include but are not limited to the fields to populate and render the UI elements described with respect to FIGS. 2A-2C such as the name of the subject, school, biographical information, artwork, etc. The data is then returned to the trading card platform 101 (e.g., via message 407).

The trading card platform 101 then begins using the card identifier to further query for one or more parameters that are used to determine the value metric 121 for the trading card 107 of interest. For example, the trading card platform 101 can perform any combination of one or more of the following queries:

a query for sponsorship data 123 based on the card identifier associated with the trading card 107 (e.g., via message 409) including a request for any content from content providers 133 that is included with the trading card 107 (e.g., via message 411), with query results returned to the trading card platform 101 (e.g., via message 413);

a query for services data 125 for any services that are included or otherwise available to be performed by the subject of the trading card 107 (e.g., examples of the services include but are not limited to autographs, texts, calls, voice messages, social media posts, creation of videos, live videos, pictures, meet and greets, etc.) (e.g., via message 415), with query results returned to the trading card platform 101 (e.g., via message 417);

a query for subject data 103 for one or more attributes of the subject (e.g., via message 419), with query results returned to the trading card platform 101 (e.g., via message 421); and a query for artist data 105 for one or more attributes of the artist (e.g., via message 425), with query results returned to the trading card platform 101 (e.g., via message 421).

In one embodiment, the trading card platform 101 can use the query results to compute the value metric 121 for the trading card 107 of interest. It is contemplated that the trading card platform 101 can use any process or algorithm to aggregate or transform the query results to the value metric 121. One example process includes but is not limited to a heuristic approach based on one or more equations configured in the trading card platform 101 to perform the computation of the value metric 121. For example, the following equation is one but not exclusive example that can be used to compute the value metric 121 from sponsorship data 123:

$$V_{Card} = \sum_{i=1}^{n} V_{PI_i}$$

where $V_{Card}$ is the value metric 121 of the trading card 107, n is total number of promotional items (PI), and $V_{PI_i}$ is the value of each individual promotional item ($PI_i$).

In some embodiments, additional or alternative parameters or attributes (e.g., services data 125, subject data 103, artist data 105, content from content providers 133) beyond or instead of sponsorship data 123 (e.g., promotional items) are considered to compute the value metric 121. Accordingly, the following is another but not exclusive example equation that can be used to compute the value metric 121:

$$V_{Card} = \sum_{i=1}^{n} V_{PI_i} + \sum_{i=1}^{m} V_{S_i} + \sum_{i=1}^{j} V_{C_i} + \sum_{i=1}^{k} V_{SA_i} + \sum_{i=1}^{l} V_{AA_i}$$

where $V_{Card}$ is the value metric 121 of the trading card 107, n is total number of promotional items (PI), $V_{PI_i}$ is the value of each individual promotional item ($PI_i$), m is total number of services (S) included or otherwise available from the subject, $V_{S_i}$ is the value of each individual service ($S_i$), j is total number of included content items (C), is the value of each individual content item ($C_i$), k is total number of subject attributes (SA), $V_{SA_i}$ is the value of each individual subject attribute ($SA_i$), l is total number of artist attributes (AA), and $V_{AA_i}$ is the value of each individual artist ($AA_i$).

In yet other embodiment, the trading card platform 101 can consider individual weights of the different items or parameters/attributes when computing the value metric 121. In this way, the trading card platform 101 can account for differential effects that different items/parameters have on the value metric 121. For example, the value of one promotional item may have a bigger effect on the value metric 121 than another promotional item, or the value of one subject attribute (e.g., recruiting rating) may have a bigger effect on the value metric 121 than another subject attribute (e.g., college major). Accordingly, the following is another but not exclusive example equation that can be used to compute the value metric 121:

$$V_{Card} = \sum_{i=1}^{n} w_{PI_i} V_{PI_i} + \sum_{i=1}^{m} w_{S_i} V_{S_i} +$$

$$\sum_{i=1}^{j} w_{C_i} V_{C_i} + \sum_{i=1}^{k} w_{SA_i} V_{SA_i} + \sum_{i=1}^{l} w_{AA_i} V_{AA_i}$$

where $V_{Card}$ is the value metric 121 of the trading card 107, n is total number of promotional items (PI), $V_{PI_i}$ is the value of each individual promotional item ($PI_i$), $w_{PI_i}$ is the weight for each individual promotional item ($PI_i$), m is total number of services (S) included or otherwise available from the subject, $V_{S_i}$ is the value of each individual service ($S_i$), $w_{S_i}$ is the weight for each individual service ($S_i$), j is total number of included content items (C), $V_{C_i}$ is the value of each individual content item ($C_i$), $w_{C_i}$ is the weight for each individual content item ($C_i$), k is total number of subject attributes (SA), $V_{SA_i}$ is the value of each individual subject attribute ($SA_i$), $w_{SA_i}$ is the weight for each individual subject attribute ($SA_i$), l is total number of artist attributes (AA), $V_{AA_i}$ is the value of each individual artist ($AA_i$) and $w_{AA_i}$ is the weight for each individual subject attribute ($AA_j$).

It is noted that the above equations are provided by way of illustration and not as limitations. It is contemplated that any equivalent equation or algorithm can be used to compute the value metric 121 for a trading card 107.

In alternative embodiments, instead of a heuristic or equation-based approach, the trading card platform 101 can use machine learning to predict the value metric 121. More specifically, the trading card platform 101 can compute input features based on the query results from the one or more of the sponsorship data 123, services data 125, subject data 103, artist data 105, content from content providers 133, or services platform 129. The input features can then be fed into a machine learning model that has been trained to predict the value metric 121 (e.g., the output of the trained machine learning model).

In one embodiment, the machine learning model can be trained using a training data set comprising examples of trading card features that have been labeled with corresponding value metrics 121. This labeled data is used as the ground truth data for training. Multiple different loss functions and/or supervision schemes can be used alternatively or together to train the machine learning model to predict the value metric 121 for a trading card 107. One example scheme is based on supervised learning. For example, in supervised learning, the system 100 can incorporate a learning model (e.g., a logistic regression model, Random Forest model, and/or any equivalent model) to train the machine learning model to make predictions (e.g., predictions of the value metric 121) from input features. During training, the system 100 can feed feature sets from a training data set into the machine learning model to compute a predicted value metric 121 using an initial set of model parameters. The system 100 then compares the predicted matching probability and value metric 121 to ground truth data in the training data set for each training example used for training. The system 100 then computes an accuracy of the predictions (e.g., via a loss function) for the initial set of model parameters. If the accuracy or level of performance does not meet a threshold or configured level, the system 100 incrementally adjusts the model parameters until the machine learning model generates predictions at a desired or configured level of accuracy with respect to the annotated labels in the training data (e.g., the ground truth data). In other words, a "trained" machine learning model has model parameters adjusted to make accurate predictions (e.g., predictions of the value metric 121) with respect to the training data set. In the case of a neural network, the model paraments can include, but are not limited, to the coefficients or weights and biases assigned to each connection between neurons in the layers of the neural network.

After the trading card platform 101 computes the value metric 121 (e.g., via the heuristic approach, machine learning-based approach, or equivalent as described above), the value metric 121 can be transmitted to the application 117 (e.g., via message 427) to update the rendering of the value metric 121 in the digital representation 111 in the user interface 115 and/or store the computed value metric 121 in the value metric database, trading card data 113, or equivalent database for later access (e.g., via message 429).

In one embodiment, the trading card platform 101 stores data records indicating redeemable promotional/sponsored items (sponsorship data 123) and/or services (e.g., services data 125) that are included or otherwise available for a subject of the trading card 107 to perform (e.g., in return for a fee payment to the subject). These redeemable items and/or services can be tracked according to the various embodiments of FIGS. 5 and 6 described below. As used herein, the term "redeemable" refers to being able to present the trading card 107 in exchange for an item or service for free or at a discount.

Figure 5:
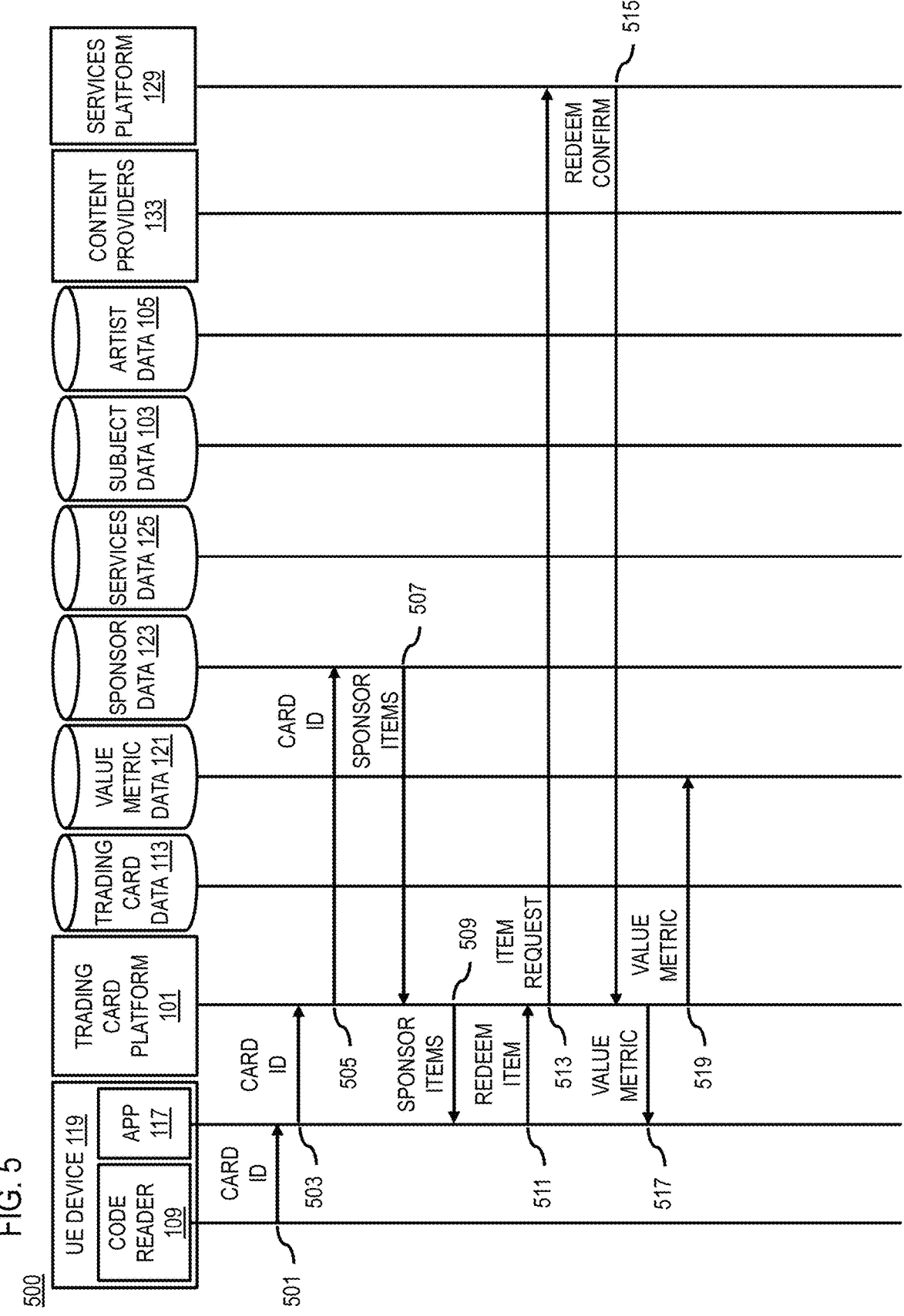
FIG. 5 is a time-sequence diagram that illustrates a sequence of messages and processes between system components for confirming redemption of an item associated with a trading card, according to one example embodiment.

FIG. 5 is a time-sequence diagram 500 that illustrates a sequence of messages and processes between system components for confirming redemption of an item associated with a trading card, according to one example embodiment. A message that is passed from one process to another is represented by horizontal arrows. The processes represented in FIG. 5 are a UE 119 associated with a code reader 109 and application 117, the trading card platform 101, trading card data 113, value metric data 121, sponsorship data 123, services data 125, subject data 103, artist data 105, content providers 133, and services platform 129.

In one embodiment, the time-sequence diagram 500 starts similarly to the time-sequence diagram 400 of FIG. 4. For example, the time-sequence diagram 500 starts with the code reader 109 (e.g., associated with UE 119) determining a card identifier associated with a trading card 107 of interest and passing the card identifier to the application 117 (e.g., via message 501). The application 117 then initiates a request (specifying the card identifier) to the trading card platform 101 to determine what promotional items are included with the trading card 107 of interest (e.g., via message 503). The trading card platform 101 uses the received card identifier to query the sponsorship data 123 for information on promotional items available for the associated card identifier (e.g., via message 505). The query results comprising, at least in part, a list of promotional/sponsored items for the trading card 107 is returned to the trading card platform 101 (e.g., via message 507). The trading card platform 101 transmits the list of available promotional items to the application 117 for presentation in the digital representation 111 for the trading card 107 of interest (e.g., via message 509).

In one embodiment, a consumer can interact with the digital representation 111 to select one or more promotional/sponsored items for redemption (e.g., as illustrated in FIG. 2C above) and transmits the selected item(s) to the trading card platform 101 for processing (e.g., via message 511). In response, the trading card platform 101 generates an item redemption request and transmits the request to a services platform 129 (or service 131 of the services platform such as but not limited to a shopping service, electronic storefront, fulfillment center, and/or the like) to fulfill the item request (e.g., via message 513). The services platform 129 processes the redemption request to fulfill the order and responds to the trading card platform 101 (and/or directly to the application 117) with a redemption confirmation (e.g., an order receipt) (e.g., via message 515).

In one embodiment, the trading card platform 101 can update the value metric 121 of the card (if needed or configured to perform the update) based on the item redemption (e.g., subtract the value of the redeemed item from the value metric 121 of the card). The updated value metric 121 can be transmitted to the application 117 for presentation in the digital representation 111 of the trading card (e.g., via message 517). In addition or alternatively, the updated value metric 121 can be stored in the value metric database and/or trading card data 113 for later access (e.g., via message 519).

Figure 6:
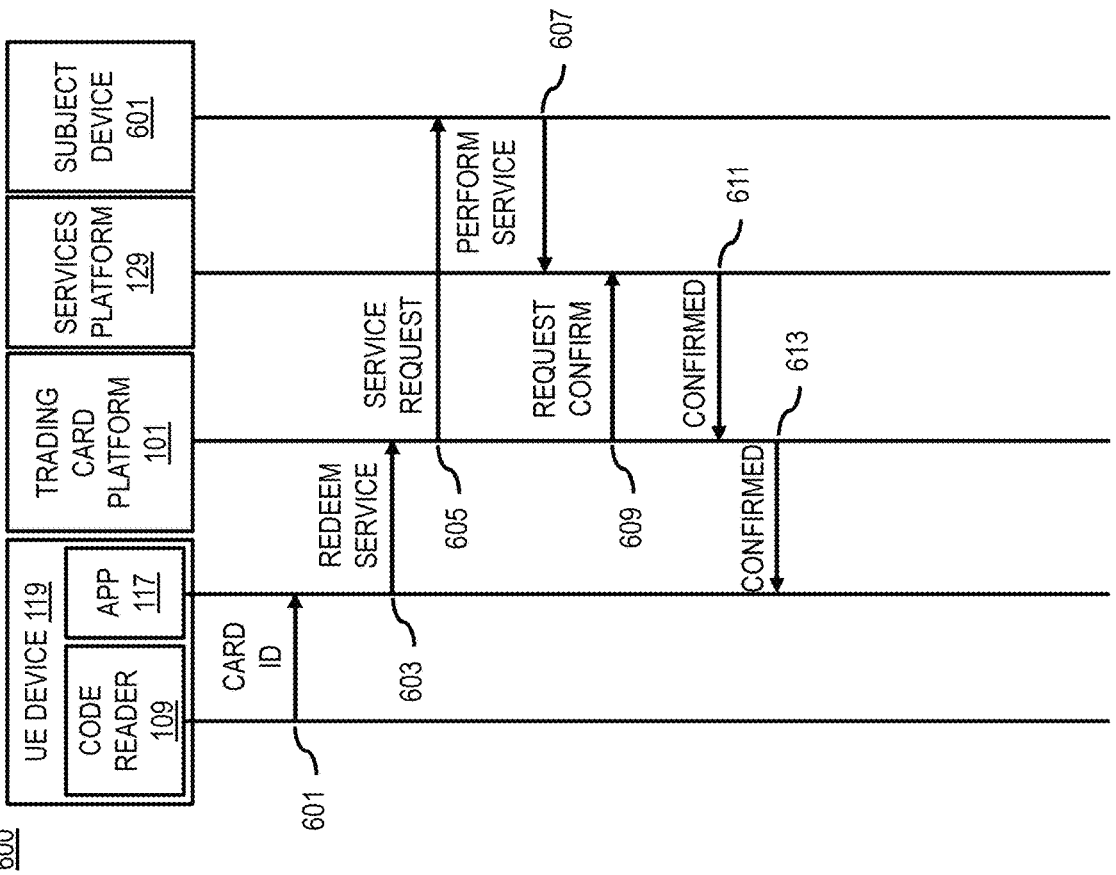
FIG. 6 is a time-sequence diagram that illustrates a sequence of messages and processes between system components for confirming performance of a service associated with a trading card, according to one example embodiment.

FIG. 6 is a time-sequence diagram 600 that illustrates a sequence of messages and processes between system components for confirming performance of a service associated with a trading card, according to one example embodiment. A message that is passed from one process to another is represented by horizontal arrows. The processes represented in FIG. 6 are a UE 119 associated with a code reader 109 and application 117, the trading card platform 101, services platform 129, and a subject device 601 (e.g., a UE 119 associated with or otherwise used by a subject).

The example FIG. 6 assumes that the code reader 109 has read the card identifier from a trading card 107 of interest and provided the card identifier to the application 117 (e.g., via message 601). The application 117 has also presented a digital representation 111 of the trading card 107 that includes a UI element for redeeming one or more services displayed in the digital representation 111. One example of a service includes but is not limited to the service (e.g., call with an athlete) listed in UI element 205 of the digital representation 111 illustrated in FIG. 2A. A consumer can select to redeem the service (e.g., schedule call with athlete John Doe) in the digital representation 111 (e.g., via message 603).

In response to the service redemption request, the trading card platform 101 sends a service request to the subject (e.g., via message 605 transmitted to the subject's device 601). The service request, for instance, can specify the service to be performed and the details of how the service is to be performed (e.g., date, time, target person, service to use, etc.). In the example of initiating a call with a requesting consumer, the service redemption request can specify the person to contact, that person's contact information, date and time to call, etc. In one embodiment, the communications between the subject/athlete and requestor can occur via a proxy communication service provided by the trading card platform 101. For example, the proxy communication service can assign proxy phone numbers (e.g., via a voice over internet protocol (VOIP) service or equivalent) to both the subject and consumer to provide privacy and avoid exposing the actual phone numbers of either party. The subject can then use the subject device 601 to perform the requested service via the proxy service of the services platform 129 (e.g., via message 607).

In one embodiment, the trading card platform 101 can confirm that the service was completed by querying the services platform 129 (e.g., via message 609). For example, if the service is a call between the subject and a card owner, then the trading card platform 101 can query the proxy communication service of the services platform 129 to determine if a call between the two parties was completed on or near (e.g., within a threshold time window) the scheduled date and time. If the service is a social media post, the trading card platform 101 can query the social media service (e.g., a service 131 of the services platform 129) to determine whether a social media post as specified by the service was create at or near (e.g., with a threshold time window) of the scheduled time. In response, the services platform 129 can provide confirmation of the completion of the service and send the confirmation to the trading card platform 101 (e.g., via message 611) and/or the application 117 (e.g., via message 613).

Figure 7:
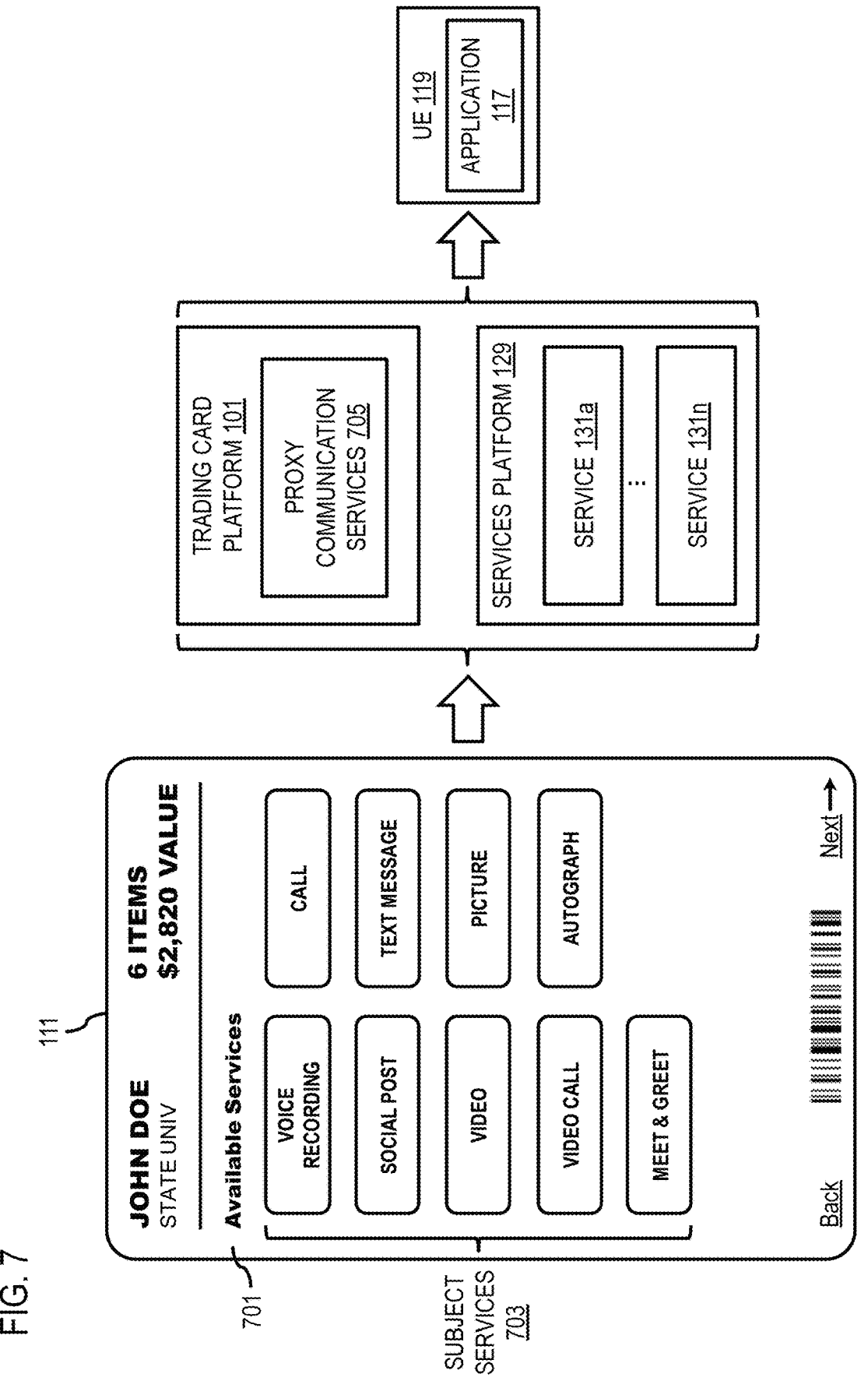
FIG. 7 is a diagram illustrating an example a digital representation of a trading card listing available services, according to one example embodiment.

FIG. 7 is a diagram illustrating an example a digital representation 111 of a trading card 107 listing available services, according to one example embodiment. The example digital representation 111 of FIG. 7 continues the examples of FIGS. 2A-2C and provides another screen of the digital representation 111 that includes a UI element 701 of available services. More specifically, the UI element 701 lists the subject services 703 that the subject has stored in the services data 125 as services that the subject is willing to perform (e.g., as part of the included items of the trading card 107 or for an extra fee payment to the subject). In one embodiment, the trading card platform 101 retrieves the services data 125 for the trading card and provides it to the application 117 of the UE device 119 for rendering the digital representation. As shown, in this example, the subject John Doe has listed that he is available to perform a voice recording, call, social post, text message, creation of a video, taking of a picture, participation on a video call, autograph, or engagement in a meet and greet event. Each of these available services is rendered in the digital representation with an interactive control element for a consumer to request any of the services.

As described with respect to the various embodiments of FIG. 6, the trading card platform 101 can provide proxy communication services 705 (e.g., phone/text relays via anonymized phone numbers or numbers identifying as the trading card platform 101). In one embodiment, the trading card platform 101 can provide first party services for one or more of the proxy communication services 703. In addition or alternatively, the proxy communication services 705 can be third party services provided by the services platform 129 and/or any of its services 131. In some embodiments, the services platform 129 can also provide connectivity to social media services and/or any other service/application for performing one or more of the available services listed in the digital representation 111 of the trading card 107 for delivery, access, connectivity, etc. to the requesting consumer's device (e.g., a UE 119 executing client application(s) 117). In one embodiment, the services associated with a trading card 107 can be renewed between each subsequent card owner (e.g., for a designated number of renewals, expiration period, etc.), can be transferred to a new card owner only if not used, or can be nontransferable depending on the preferences of the subject, the trading card platform 101, or other platform user.

Figure 8:
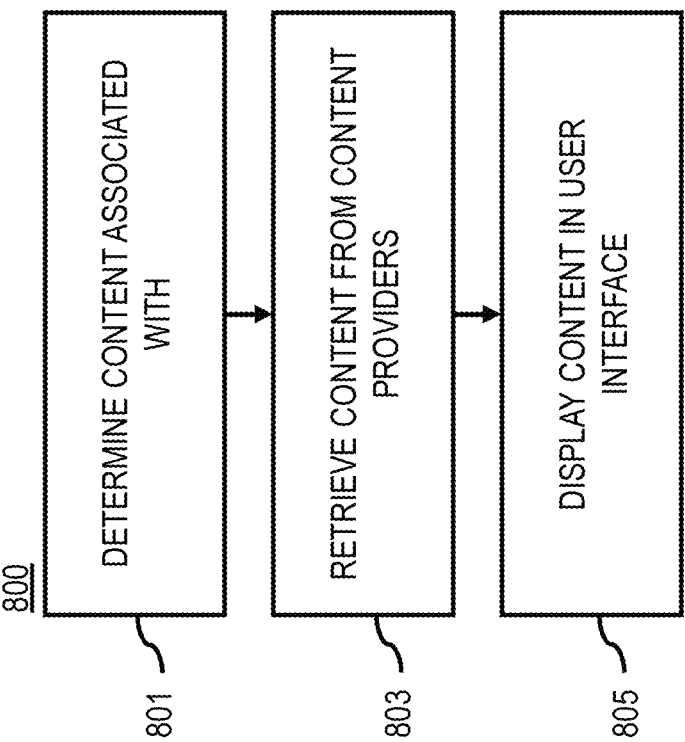
FIG. 8 is a flowchart of a process for presenting content associated with a trading card, according to one example embodiment.

FIG. 8 is a flowchart of a process 800 for presenting content associated with a trading card, according to one example embodiment. In various example embodiments, the trading card platform 101 alone or in combination with the application 117 may perform one or more portions of a process 800 and may be implemented in/by various means, for instance, a chip set including a processor and a memory as shown in FIG. 20 or in a circuitry, hardware, firmware, software, or in any combination thereof. In one example embodiment, the circuitry includes but is not limited to processing circuitry, code reading circuitry, and output circuitry. As such, the system 100, trading card platform 101, application 117, and/or any associated apparatus, device, circuitry, system, computer program product, and/or non-transitory computer readable medium can provide means for accomplishing various parts of the process 800, as well as means for accomplishing embodiments of other processes described herein. Although the process 800 is illustrated and described as a sequence of steps, it is contemplated that various embodiments of the process 800 may be performed in any order or combination and need not include all of the illustrated steps.

In one embodiment, the system 100 introduces a capability to integrate content provided content providers 133 directly into a UI element of the digital representation. In this use case, the trading card 107 and/or its digital representation 111 acts as an access and/or authentication key to initiate delivery of the content from content providers 133. As used herein, the term "content from content providers 133" can include but is not limited to programming content, broadcast content, streaming content, pay-per-view content, and/or the like.

Accordingly, in step 801, an apparatus (e.g., associated with the trading card platform 101, application 117, and/or equivalent components) determines or is otherwise configured to determine content from one or more content providers 133 associated with the trading card 107. In one embodiment, the content that is associated with a trading card 107 can be based on one or more sponsorship arrangements (e.g., providing content for the subject, a school associated with the subject, a sports league associated with the subject, etc.) as recorded in the sponsorship data 123.

In step 803, the application is further configured to retrieve the content from one or more content management systems of the one or more content providers 133. By way of example, a content management system can include servers, data centers, etc. storing a content provider's programming/broadcast/streaming/etc. content for delivery to end user devices (e.g., UE 119).

In one embodiment, the apparatus is further configured to determine an access right to the content based on the card identifier, a registration of the card identifier to a user account, or combination thereof. In other words, the retrieval and/or presentation of the content in the digital representation 111 can be limited or authorized based on an identifier or other equivalent authentication key associated with the trading card 107 and/or it's digital representation 111. In other words, the retrieving, the displaying, or a combination thereof of the content is based on the access right associated with the trading card 107.

In step 805, the application is further configured to display the content in the user interface 115 associated with the functions of the trading card platform 101. In one embodiment, the content is displayed in a user interface element that is rendered within the digital representation 111 of the trading card 107. For example, as shown in the example of FIG. 2B, the content can be rendered in UI element 223 of the digital representation 111. In other words, the digital representation 111 of the trading card 107 acts as the frontend or client for the content provided by the content providers 133.

Figure 9:
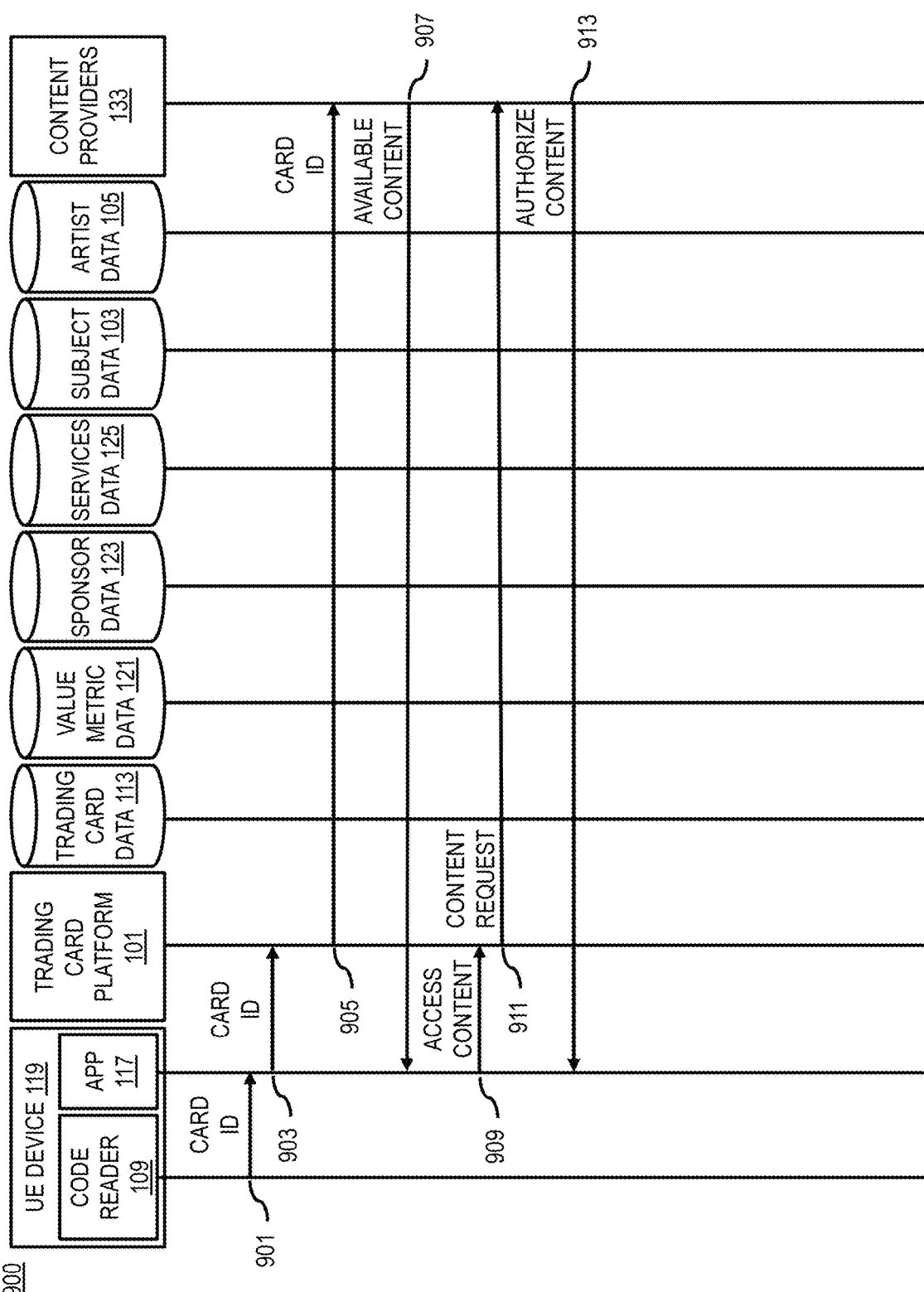
FIG. 9 is a time-sequence diagram that illustrates a sequence of messages and processes between system components for retrieving and displaying content associated with a trading card, according to one example embodiment.

Additional details of various embodiments of this trading card-based content delivery process are described with respect to FIG. 9. FIG. 9 is a time-sequence diagram 900 that illustrates a sequence of messages and processes between system components for retrieving and displaying content associated with a trading card, according to one example embodiment. A message that is passed from one process to another is represented by horizontal arrows. The processes represented in FIG. 4 are a UE 119 associated with a code reader 109 and application 117, the trading card platform 101, trading card data 113, value metric data 121, sponsorship data 123, services data 125, subject data 103, artist data 105, and content providers 133.

In one embodiment, the time-sequence diagram 900 starts with the code reader 109 (e.g., associated with UE 119) determining a card identifier associated with a trading card 107 of interest and passing the card identifier to the application 117 (e.g., via message 901). The application 117 then initiates a request (specifying the card identifier) to the trading card platform 101 to determine what content is available to be presented in the digital representation 111 of the trading card 107 of interest (e.g., via message 903). The trading card platform 101 uses the received card identifier to query content providers 133 (and/or the sponsorship data 123 in some embodiments) for information on what content is available for the associated card identifier (e.g., via message 905). The query results comprising, at least in part, a list available content for the trading card 107 is returned to the application 117 and/or the trading card platform 101 (e.g., via message 907). For example, the application 117 can display a thumbnail picture, icon, or other equivalent representation in a UI element of the digital representation 111 to indicate an availability of the content.

The card owner can then interact with the UI element of the digital representation 111 (e.g., click on a play button in the UI element) to request access to, playback, streaming, etc. of one or more of the content (e.g., via message 909). The content access request can be relayed to the trading card platform 101 or transmitted directly to the content provider 133 to initiate the streaming (e.g., via message 911). On receiving the content access request, the content provider 133 can authorize the request and then initiate delivery of the content to the application 117 for presentation in the UI element of the digital representation 111 (e.g., via message 913). As described above, in one embodiment, authorizing the request comprises determining an access right as described in the various embodiments above. For example, the authorization process can include but is not limited to determining whether the card identifier or a derivative of the card identifier is on a permitted access list maintained by the content provider 133 and/or the trading card platform 101. It is noted that this example of authorizing access is provided by way of illustration and not as a limitation. It is contemplated that any equivalent means of authorizing access based on the trading card 107 and/or its digital representation 111 can be used according to various embodiments described herein.

Figure 10:
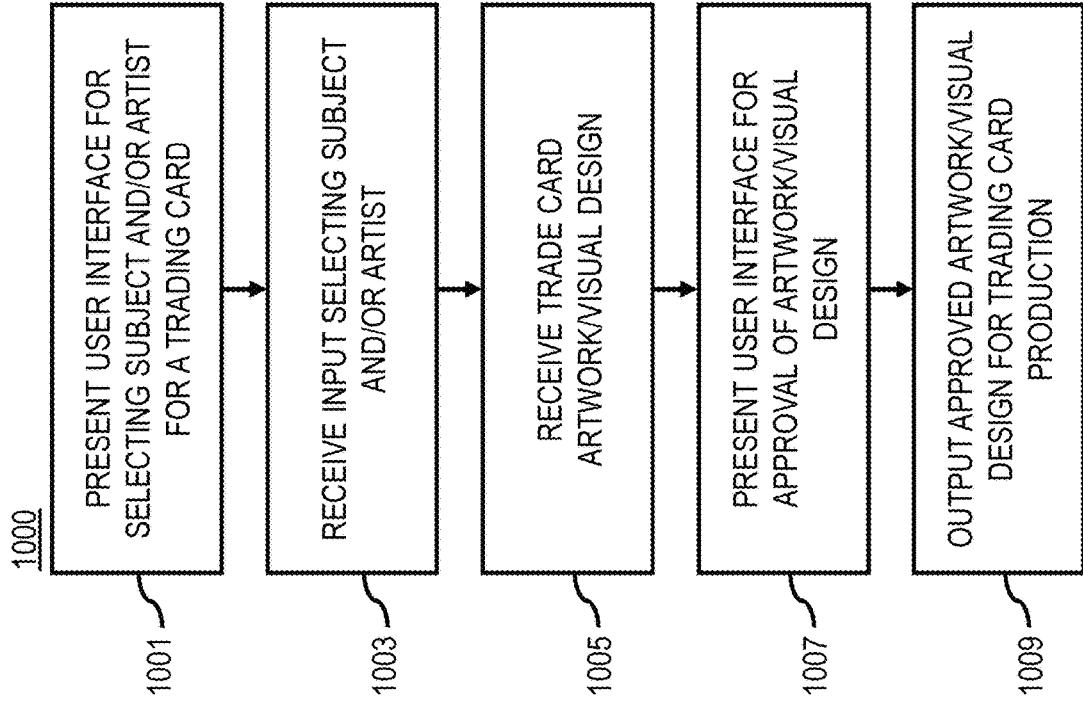
FIG. 10 is a flowchart of a process for selecting a subject and/or artist for creating a trading card, according to one example embodiment.

In one embodiment, the trading card platform 101 provides a platform to facilitate matching subjects and artists to create a trading card 107. FIG. 10 is a flowchart of a process for selecting a subject and/or artist for creating a trading card, according to one example embodiment. In various example embodiments, the trading card platform 101 alone or in combination with the application 117 may perform one or more portions of a process 1000 and may be implemented in/by various means, for instance, a chip set including a processor and a memory as shown in FIG. 20 or in a circuitry, hardware, firmware, software, or in any combination thereof. In one example embodiment, the circuitry includes but is not limited to processing circuitry, code reading circuitry, and output circuitry. As such, the system 100, trading card platform 101, application 117, and/or any associated apparatus, device, circuitry, system, computer program product, and/or non-transitory computer readable medium can provide means for accomplishing various parts of the process 1000, as well as means for accomplishing embodiments of other processes described herein. Although the process 1000 is illustrated and described as a sequence of steps, it is contemplated that various embodiments of the process 1000 may be performed in any order or combination and need not include all of the illustrated steps.

In the development of a trading card 107 and/or its digital representation 111, the coordination of what subject to present and what artist to create the artwork or visual design of the trading card 107 can be a difficult task, particularly at scale (e.g., NCAA athletes across all collegiate sports). The various embodiments of the process 1000 illustrate technical solutions for managing the subject/artist selection process as well as the workflow for reviewing and approving the associated artwork of the trading card 107. The process 1000 is described with reference to FIGS. 11A-11C which are diagrams illustrating example user interfaces for selecting a subject and/or artist for creating a trading card, according to one example embodiment.

In step 1001, the system 100 and/or related apparatuses (e.g., associated with the trading card platform 101 and/or application 117) present or are configured to present a trading card creation user interface comprising one or more user interface elements for a subject to be depicted in the trading card to select an artist to create a visual design of the trading card. In addition or alternatively, the application is further configured to present a trading card creation user interface comprising one or more user interface elements for an artist that is to create a visual design of the trading card to select a subject to depict in the trading card.

Figures 11A, 11B:
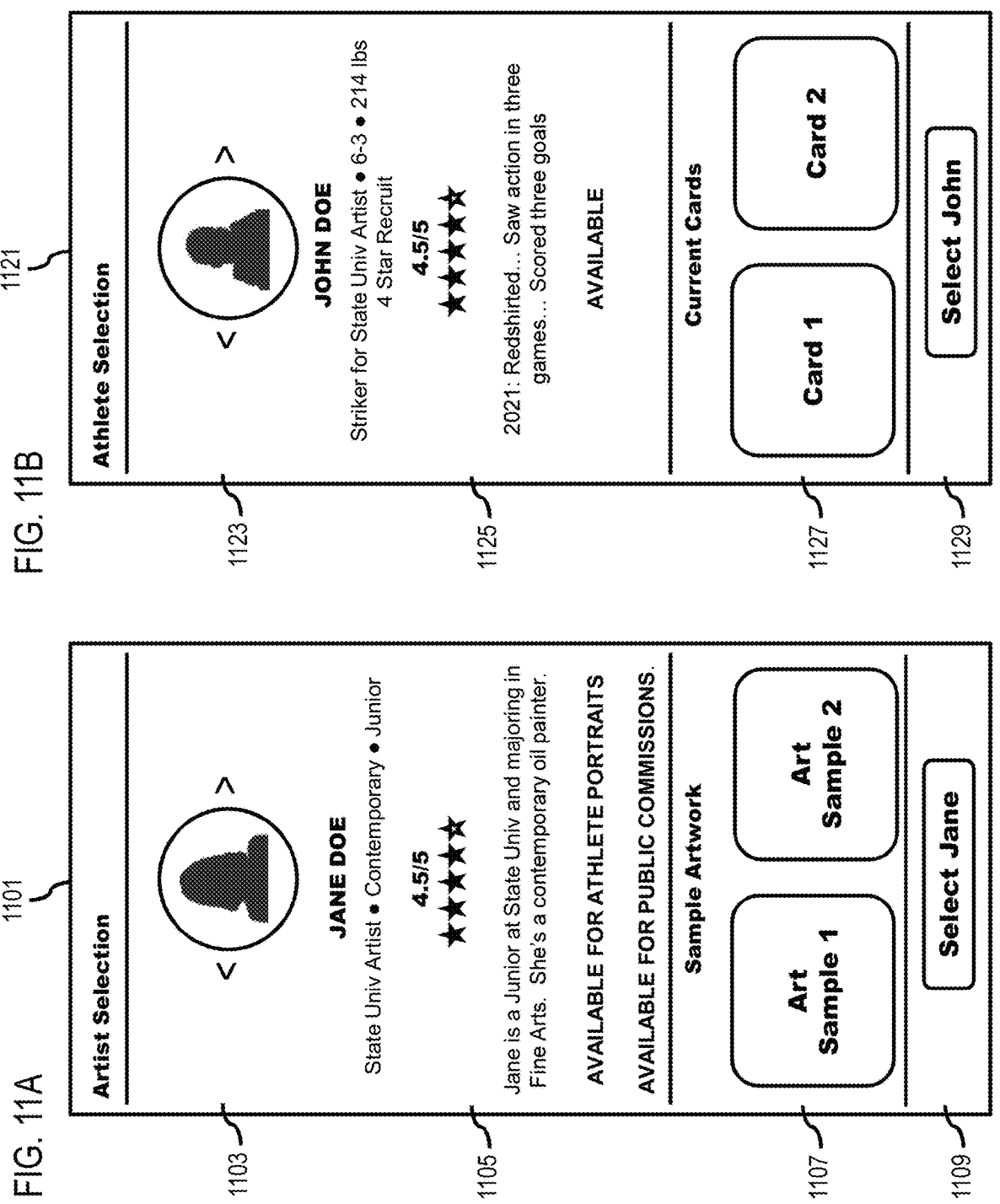
FIGS. 11A-11C are diagrams illustrating example user interfaces for selecting a subject and/or artist for creating a trading card, according to one example embodiment.

In other words, the system 100 provides respective user interfaces and interactions to mediate the interaction and selection of subjects and artists for a trading card 107. For example, FIG. 11A illustrates a UI 1101 for subject (e.g., athlete) or any other user to select an artist to create a trading card 107. As shown, the UI 1101 has a UI element 1103 displaying a picture or avatar of the artist (e.g., "Jane Doe" in this example) and controls for scrolling between available artists (e.g., "<" to scroll left and ">" to scroll right). The UI 1101 also has a UI element 1105 displaying biographical information about the artist including attributes such as but not limited to: name, school/organizational affiliation, art style, rating, background information, artwork, and availability. The UI 1101 further has a UI element 1107 of artwork samples created by the artist, and a UI element 1109 to select the artist for creating a trading card 107. The artist information, for instance, can be queried from the artist data 105 and presented in the UI 1101 and its UI elements. In one embodiment, the artist selection UI 1101 can be presented on a device (e.g., UE 119) associated with the subject or any other user who is searching for artists to create artwork for a trading card 107 depicting the subject.

FIG. 11B illustrates a UI 1121 for the opposite use case of FIG. 11A and can be used by an artist or any other user who is searching for a subject (e.g., athlete) to depict in a trading card 107. As shown, the UI 1121 has a UI element 1123 displaying a picture or avatar of the subject or athlete (e.g., "John Doe" in this example) and controls for scrolling between available subjects (e.g., "<" to scroll left and ">" to scroll right). The UI 1121 also has a UI element 1125 displaying biographical information about the subject including attributes such as but not limited to: name, school/organizational affiliation, body measurements, recruit status, rating, background information, and availability. The UI 1121 further has a UI element 1127 of any other trading cards 107 depicting the same subject or athlete, and a UI element 1129 to select the subject to depict in a trading card 107. The subject information, for instance, can be queried from the subject data 103 and presented in the UI 1121 and its UI elements. In one embodiment, the subject selection UI 1121 can be presented on a device (e.g., UE 119) associated with the artis or any other user who is searching for subjects to create a trading card 107.

In one embodiment, the trading card platform 101 can present either or both of the artist selection UI 1101 and the subject selection UI 1121 depending on the configuration of the system 100. For example, to enable mutual selection of the artists and subjects, both UIs 1101 and 1121 can be presented. On the other hand, an artist-centric implementation may present only the subject selection UI 1121 so that only artists control who their subjects will be, and a subject-centric implementation may present only the artist selection UI 1101 so that only subject's control who their artists will be.

In step 1003, the trading card platform 101 receives or is configured to receive an input for selecting subject and/or artist via the respective UIs 1121 and 1101. For example, the input can be received as an interaction (e.g., a click, touch, or other selection action) on the UI elements configured to indicate a selection (e.g., UI element 1109 of UI 1101 to select an artist and UI element 1129 of UI 1121 to select a subject/athlete). After selection of the artist and/or subject, the trading card platform 101 stores the selection, for instance, the in trading card data 113 associated with the trading card 107 to be created. The trading card platform 101 can transmit confirmation of the selection to the respective devices (e.g., UEs 119) of the selected artist and/or selected subject.

In step 1005, the trading card platform 101 is configured to receive trading card artwork/visual design. In one embodiment, on being selected, the trading card platform 101 instructs the artist to prepare artwork for review and approval. The review and approval can be performed by the subject and/or any other user (e.g., a representative of the provider of the trading card platform 101, a sponsor or potential sponsor, etc.) designated by the trading card platform 101. Accordingly, in one embodiment, the trading card platform 101 is configured to receive the review draft of the artwork. If the artwork is in digital format, the artwork can be received directly by the trading card platform 101 and stored in the trading card data 113 and/or artist data 105. If the artwork is physical format, the artist can use the application 117 executing on the UE 119 or any other equivalent application or device to configure the physical artwork into digital artwork for storage in the trading card data 113 and/or artist data 105.

Figure 11C:
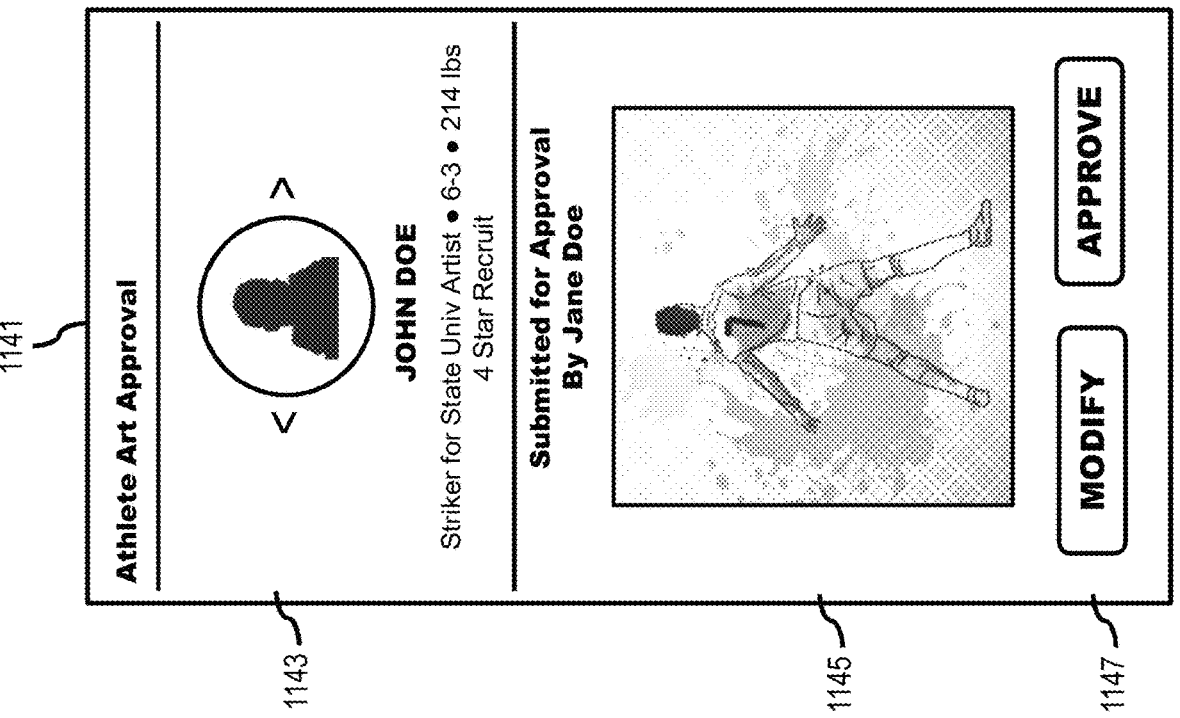

In step 1007, the trading card platform 101 presents or is configured to present a user interface for approval of the artwork/visual design of a trading card 107 submitted by the artist. Per the various embodiments discussed in step 1005, the approval user interface can be presented on a device (e.g., UE 119) associated with any selected approving authority including but not limited to the subject and/or any other designated reviewer/approval. FIG. 11C illustrates an example artwork approval UI 1141. In this example, the UI 1141 includes a UI element 1143 identifying the reviewer/approver (e.g., the subject "John Doe"), a UI element 1145 displaying the artwork to be reviewed and identifying the artist, and UI element 1147 presenting approval elements (e.g., an element to request modification of the artwork and an element to approve the artwork as presented).

In one embodiment, in addition or as an alternate to the manual review process described in the embodiments above, the trading card platform 101 perform automated review using, for instance, a machine learning model that accepts the artwork as an image (e.g., scaled to a resolution compatible input of the machine learning model) and outputs classifications of potential features of concern that could result a request to modify the artwork or to reject the artwork complete. For example, the machine learning model can be trained to detect the depiction of items or objects that can potentially infringe on the intellectual property rights of others (e.g., presence of unlicensed trademarks, logos, images, etc.) as well as other prohibited categories (e.g., products, objects, etc. prohibited by the NCAA NIL policy, the subject, the provider of the trading card platform 101, etc.).

In step 1009, after review and approval, the trading card platform 101 outputs or is configured to output the approved artwork/visual design for trading card production. For example, the trading card platform 101 can store the approved artwork in the trading card data 113 with a flag or other database field indicating that the artwork is approved and ready for production.

In one embodiment, the trading card platform 101 is a comprehensive platform that includes functions for different types of users involved in the trading card process. These users include but are not limited to subjects, artists, consumers, corporations or other sponsors, and the like. FIGS. 12-16 are process flows directed to functions of the trading card platform 101 that are specific to the different types of users.

Figure 12:
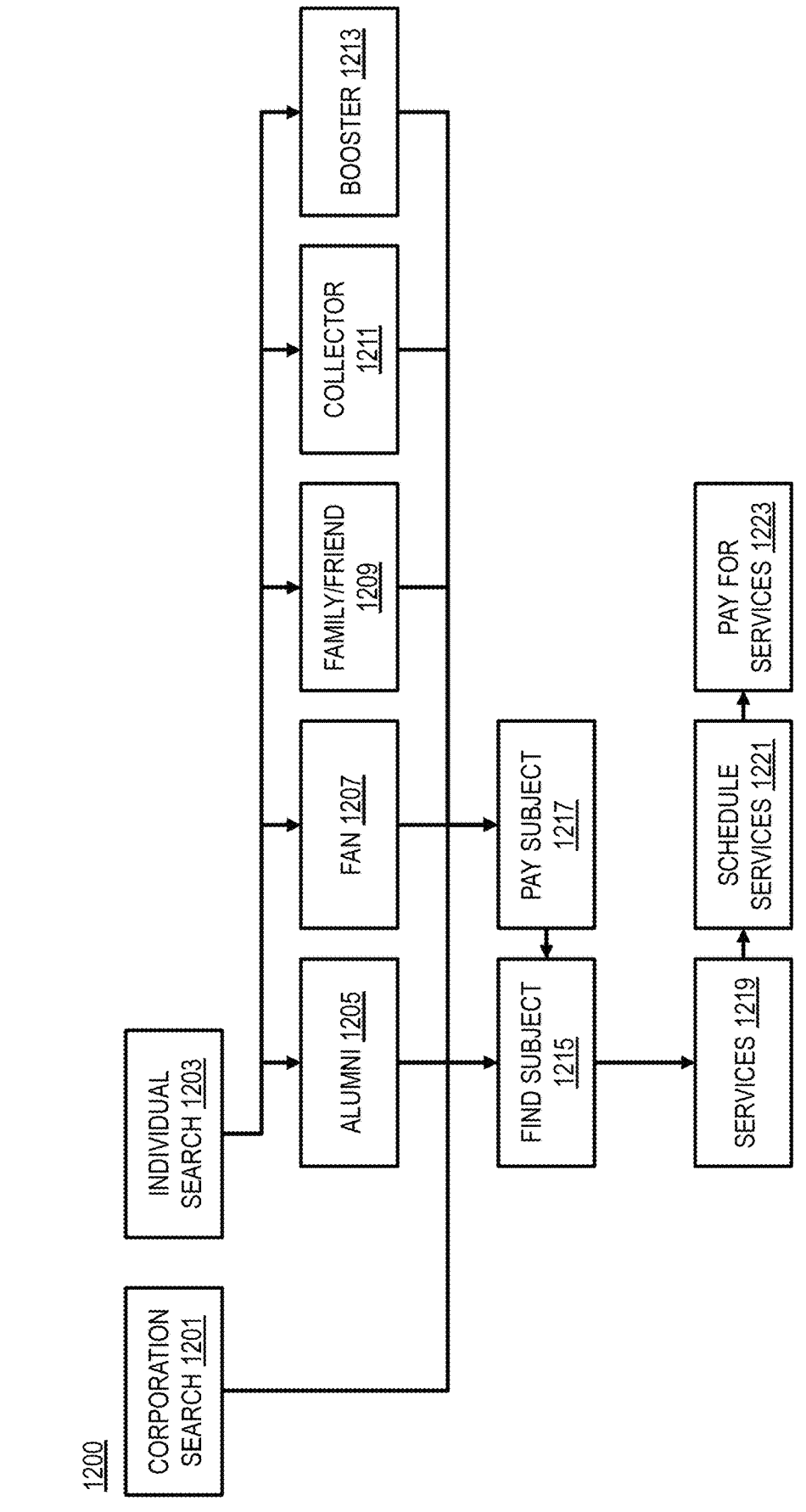
FIG. 12 is a diagram of a process flow of a trading card platform for searching for a subject, according to one example embodiment.

FIG. 12 is a diagram of a process flow 1200 of the trading card platform 101 for searching for a subject (e.g., athlete), according to one example embodiment. The trading card platform 101 separates the process flow 1200 into two general search categories: (1) a corporation/sponsor search 1201 process flow directed to entities/persons who want the subject (e.g., collegiate athletes under the NCAA NIL policy) to market their product; and (2) individual search 1203 for individuals with differing intended uses of the trading card platform 101. Because of the different intended uses of individuals, the individual search 1203 can be further subcategorized by individual types: (1) alumni 1205 who love a particular school and want to keep the subject/athlete at the school; (2) fans 1207 who love the school and want to support their subjects/athletes; (3) family members and friends 1209 who want to support individual subjects/athletes that are related or are their friends; (4) collectors 1211 who are searching for specific trading cards; and (5) boosters 1213 who love the school and want to keep the subject/athlete at the school.

In one embodiment, the trading card platform 101 provides search user interfaces and functions specific to each of the types of users into functional categories: (1) a function 1215 to find a subject; and (3) a function 1217 to pay a subject 1217. For example, the find subject function 1215 provides a search user interface that can query for athletes or groups of athletes by name, school, and/or any other attribute stored in the subject data 103. Once found, the pay subject function 1217 (e.g., pay student athlete) provides a user interface for searching for services 1219 for which the found subjects/athletes can be paid. Examples of the services 1219 include but are not limited to: (1) video recording—making a video for the requesting user; (2) call—making a call to the requesting user; (3) social posts—making social media posts on selected social media services to or for the requesting user such as but not limited to making comments, following, liking, posting, and/or the like. In one embodiment, the trading card platform 101 provides functions and user interfaces such as but not limited to a function 1221 to schedule the requested service(s) and a function 1223 to pay for the requested services.

FIG. 13 is a diagram of a process flow 1300 for a subject to interact with the trading card platform 101, according to one example embodiment. The trading card platform 101 provides a user interface for subject login 1301 to initiate the process flow 1300. It is contemplated that the trading card platform 101 can use any authentication mechanism (e.g., username/password, multi-factor authentication, etc.) to perform subject login 1301. In one embodiment, once the subject/athlete is logged in, the trading card platform 101 can present a service center function 1303 and associated user interfaces. The service center function 1303, for instance, enables the subject to view service requests from corporations and/or users to perform a request service (e.g., autographs, texts, calls, voice messages, create a video, participate in a live video, take a picture, meet and greet, etc.). The service center function 1301 enables the subject to review and approve each service request via, for instance, an approval center. The approval center includes functions and related user interfaces for changing prices of the service, approving the service request, or rejecting the service request. If a price change is requested by the subject, the approval center function also enables the subject to track whether the price has changed and whether the requesting consumer has rejected or accepted the price change. If the subject approves the request without change, the approval center function enables the subject to perform the service and then receive payment for the service from the requesting consumer. If the subject rejects the request, then the trading card platform 101 notifies the requesting consumer of the rejection.

In one embodiment, the trading card platform 101 also provides a profile function 1305 for the subject to edit the subject's profile information (e.g., stored in subject data 103). The profile function 1305 includes, for instance: (1) a sub-function to view the availability status of the subject on the trading card platform 101; (2) a sub-function to view the subject's usage statistics on the trading card platform 101; (3) a sub-function to support the subject's social media network logins; (4) a sub-function to specify services (e.g., autographs, texts, calls, voice messages, create a video, participate in a live video, take a picture, meet and greet, etc.) that the subject is willing to provide to consumers; and (5) a sub-function to view other NIL opportunities directed to the subject.

In one embodiment, the trading card platform 101 also provides a search for artists function 1307 and associated user interfaces for the subject to find and engage an artist and an art approval center function 1309. Examples of the functions 1307 and 1309 are described with respect to process 1000 of FIG. 10.

In one embodiment, the trading card platform 101 also provides an analytics function 1311 and associated user interfaces for various analytical function such as but not limited to: (1) activity—view activity associated with the subject and related services and trading cards 107 on the trading card platform 101; (2) views—monitor the number views of the subject's profile, trading cards 107, services, etc. on the trading card platform 101; (3) market value of cards—view the value metric(s) 121 of the subject's card(s); (4) impressions—view the number of impressions of the subject's trading card(s) 107; (5) suggest rates—view the suggested rates for the subject's services as computed by the trading card platform 101; (6) engagements—view scheduled or proposed engagements (e.g., arising from ML opportunities); and (7) digital marketing card—view digital marketing activities related to the subject's trading card(s) 107.

In one embodiment, the trading card platform 101 also provides a transactions function 1313 for the user to view transactions in various categories including but not limited to: (1) services—transactions related to services provided by the subject; (2) auctioned art—transactions related the auctioning of the original artwork used to create the subject's trading card(s); (3) apparel—transactions related to apparel; (4) digital card marketing sales—sales related to the subject's digital trading card(s) 107; (5) physical cards—sales related to the subject's physical trading card(s) 107; and (6) limited number of prints—sales of limited prints of the artwork associated with the subject's trading card(s) 107.

FIG. 14 is a diagram of a process flow 1400 for an artist to interact with a trading card platform 101, according to one example embodiment. The trading card platform 101 provides a user interface for artist login 1401 to initiate the process flow 1300. It is contemplated that the trading card platform 101 can use any authentication mechanism (e.g., username/password, multi-factor authentication, etc.) to perform artist login 1401. In one embodiment, once the artist is logged in, the trading card platform 101 can present a service center function 1403 and associated user interfaces. The service center function 1403, for instance, enables the artist to view commission requests to create new artwork (e.g., request from a subject to commission artwork for a trading card 107) and request to buy existing artwork from the artist.

In one embodiment, the trading card platform 101 also provides a profile function 1405 for the artist to edit the artist's profile information (e.g., stored in artist data 105). The profile function 1405 includes, for instance: (1) a sub-function to add artwork to the artist's profile; (2) a sub-function to edit the artist's biographical information; and (3) a sub-function to a photo or other media of the artist.

In one embodiment, the trading card platform 101 also provides a search for subjects function 1407 and associated user interfaces for the artist to find a subject and an art approval center function 1409. Examples of the functions 1407 and 1409 are described with respect to process 1000 of FIG. 10.

In one embodiment, the trading card platform 101 also provides an analytics function 1411 and associated user interfaces for various analytical function such as but not limited to: (1) activity—view activity associated with the artist and related services on the trading card platform 101; (2) views—monitor the number views of the artist's profile, artwork, services, etc. on the trading card platform 101; (3) market value of cards—view the value metric(s) 121 of the trading card(s) 107 featuring the artist's artwork; (4) impressions—view the number of impressions of the subject's trading card(s) 107; (5) sales—view the sales of the artist's artwork; (6) engagements—view scheduled or proposed artwork commissions; and (7) digital marketing card—view digital marketing activities related to the trading card(s) 107 featuring the artist's artwork.

In one embodiment, the trading card platform 101 also provides a transactions function 1413 for the artist to view transactions in various categories including but not limited to: (1) originals/commission—transactions related to the sale of the artist's original and commissioned artwork; (3) apparel—transactions related to apparel featuring the artist's artwork; (4) digital card marketing sales—sales related to the digital trading card(s) 107 featuring the artist's work; (5) physical cards—sales related to the physical trading card(s) 107 featuring the artist's work; and (6) limited number of prints—sales of limited prints of the artist's artwork.

Figure 15:
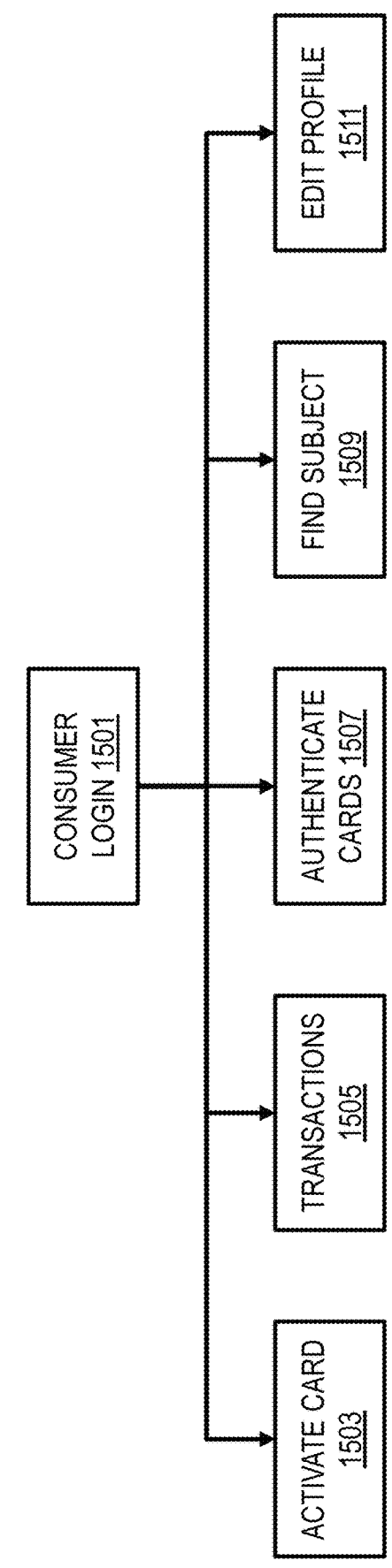
FIG. 15 is a diagram of a process flow for a consumer to interact with a trading card platform, according to one example embodiment.

FIG. 15 is a diagram of a process flow 1500 for a consumer to interact with a trading card platform 101, according to one example embodiment. A consumer refers, for instance, to a user who owns or wants to buy, sell, or trade trading cards 107 on the trading card platform 101. The trading card platform 101 provides a user interface for consumer login 1501 to initiate the process flow 1500. In one embodiment, a consumer refers to a user of the trading card platform 101 who buys, sells, or trades the trading cards 107 and/or related services. It is contemplated that the trading card platform 101 can use any authentication mechanism (e.g., username/password, multi-factor authentication, etc.) to perform subject login 1501. In one embodiment, once the consumer is logged in, the trading card platform 101 can present a function 1503 to activate trading card 107 (e.g., digital and/or physical). Activation, for instance, refers to registering the card with the consumer's account to link the card to a digital representation 111 and to activate the promotions, services, sponsorships, content, etc. associated with the trading card 107. The activate card function 1503 can also provide functions and user interfaces for using the trading card 107 (e.g., redeeming items, services, content, etc.) and for gifting the trading card 107.

In one embodiment, the trading card platform 101 also provides a transactions function 1505 and related user interfaces for the consumer to view passes purchases or conduct new purchases of trading cards 107, related services, and/or apparel. The transactions function 1505 also enables the consumer to buy, sell, trade, or gift trading cards 107, and to view updated value metrics 121 of the trading cards 107.

In one embodiment, the trading card platform 101 also provides a function 1507 to authenticate trading cards 107. It is contemplated that the trading card platform 101 can use any means to authenticate trading cards 107 to determine whether the card is real or counterfeit/expired/invalid/etc. For example, watermarks and/or any other anti-counterfeiting measures known in the art may applied.

In one embodiment, the trading card platform 101 also provides function 1509 to find a subject/athlete. Examples of the find subject function 1509 described with respect to process flow 1200 of FIG. 12 as well as the process 1000 of FIG. 10.

In one embodiment, the trading card platform 101 also provides an edit information 1511 for the consumer to edit information about herself/himself. For example, the consumer can add or edit information such as but not limited to contact information, profile picture, and/or billing information as they appear on the trading card platform 101.

Figure 16:
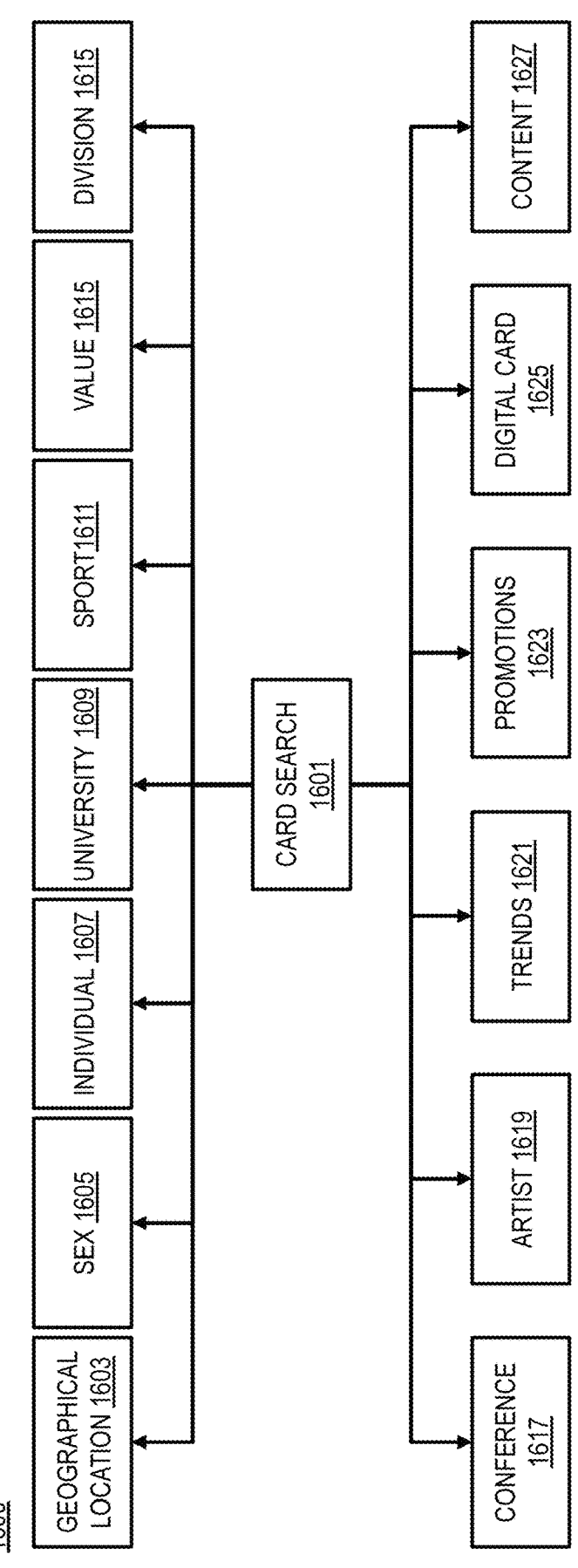
FIG. 16 is a diagram of a process flow for searching for a trading card on a trading card platform, according to one example embodiment.

FIG. 16 is a diagram of a process flow for searching for a trading card on a trading card platform, according to one example embodiment. In one embodiment, the trading card platform 101 provides functions and associated user interfaces for searching for trading cards 107 (e.g., card search function 1601). These card search function 1601 include searching for trading cards 107 in order to buy, sell, trade, or gift the cards. The card search function 1601 can apply search filters such as but not limited to: (1) by geographical location 1603, (2) by sex 1605 of the subject/athlete; (3) by individual 1607; (4) by university 1609; (5) by sport 1611; (6) by value 1613; (7) by division 1615; (8) by conference 1617; (9) by artist 1619; (10) by trends 1621; (11) by promotions 1623; (12) by digital card 1625; and (13) by associated content 1627. It is noted that the example search filters above are provided by way of illustration and not as limitations. It is contemplated that any attribute can be used as a search filter and the search filters can depend on the type of subject. For example, when the trading cards 107 relate to domains other than athletes, the attributes can be domain specific. For example, search filters relevant to cards may include but are not limited to make, model, year, mileage, installed equipment, etc. As another example, search filters relevant to animals can include but are not limited to breed, age, fur color, etc.

FIG. 17 is a flowchart of a process 1700 for freezing dynamic attributes of a trading card, according to one example embodiment. In various example embodiments, the trading card platform 101 alone or in combination with the application 117 may perform one or more portions of a process 1700 and may be implemented in/by various means, for instance, a chip set including a processor and a memory as shown in FIG. 20 or in a circuitry, hardware, firmware, software, or in any combination thereof. In one example embodiment, the circuitry includes but is not limited to processing circuitry, code reading circuitry, and output circuitry. As such, the system 100, trading card platform 101, application 117, and/or any associated apparatus, device, circuitry, system, computer program product, and/or non-transitory computer readable medium can provide means for accomplishing various parts of the process 300, as well as means for accomplishing embodiments of other processes described herein. Although the process 300 is illustrated and described as a sequence of steps, it is contemplated that various embodiments of the process 300 may be performed in any order or combination and need not include all of the illustrated steps.

In the various embodiments of the trading cards 107 (e.g., physical and/or digital trading cards) described herein, the various parameter or attribute data records (e.g., promotional items provide free or at a discount with the trading card 107, attributes of the subject of the trading card 107, attributes of an artist that created the artwork for the trading card 107) and/or the value metric data 121 computed therefrom are "dynamic." As used herein, the term "dynamic" refers to the one or more of the attribute records having a capability to be changed or updated over time (e.g., the trading card data 113, subject data 103, artist data 105, sponsorship data 123, services data 125, and/or the like are databases that are updated and do not remain fixed). It is contemplated that trading platform 101 can be configured to use any criteria for the determining the frequency of updates for one or more of the attribute data records to be considered as "dynamic." For example, the frequency of update for classifying data as dynamic include but is not limited to data that is updated continuously, periodically, according to a fixed schedule, on demand, and/or the like at designated frequency (e.g., once per week, month, quarter, after specific events, etc.). Examples of dynamic data can include but is not limited to: (1) sports performance statistics (e.g., number of points per game, passing yards, scoring opportunities, etc.) for a subject of a trading card 107 who is an athlete; (2) artwork portfolio, artwork sales, social media followers, etc. for an artist associated with a trading card 107; etc.

This dynamic data has the advantage of providing the most up-to-date attribute data for presentation on the trading card 107 and/or digital representation of the trading card 107. However, in some cases, a user may want to capture "moments" in this continually updated stream of dynamic data (e.g., sports statistics). As used herein, the term "moment" refers to specific point in time at point the dynamic attribute(s) of a trading card is "frozen" by, e.g., generating a specific static instance of the dynamic data for presentation on the trading card 107. As used herein, a "static instance" is a data record which the values of all or a portion of the data fields of the dynamic data are fixed at a given period of time and is no longer updatable. The various embodiments of the process 1700 describe how the system 100 can be used to freeze the dynamic data and capture specific "moments" or static instances of the data record(s) captured and presented in a trading card 107 to memorialize the moment. For example, key sports performance statistics can be frozen before or after a key game (e.g., championship game, first game of the year, etc.) as specified by the system 100 or a user of the system 100 (e.g., a collector, fan, etc.).

As in the various embodiments of process 300 of FIG. 3, the process 1700 assumes that a trading card 107 configured with a machine readable code has been created to include the characteristics and elements of a trading card 107 discussed above. For example, the trading card 107 can depict or otherwise include, at a minimum, a barcode or other machine readable code (e.g., QR code, NFC, etc.). The machine readable code, for instance, encodes a card identifier that can be processed by the trading card platform 101. In addition to the machine readable code, the trading card 107 can include all or a portion of the of the elements described with respect to embodiments the digital representation 111 described with respect to FIGS. 2A-2C.

In one embodiment, the trading card 107 can be a physical and or digital/electronic trading card that, for instance, can be linked or otherwise registered to a corresponding digital representation 111 of the trading card 107 stored by the trading card platform 101 (e.g., in trading card data 113 or equivalent database). One example of digital trading card 107 includes but is not limited to a non-fungible token (NFT) that tracks the ownership and any related sponsorship/promotional contracts as smart contracts on a blockchain (e.g., maintained via the Ethereum network or other equivalent blockchain or cryptocurrency network). In one embodiment, the visual design of the digital trading card 107 can mirror all or a portion of the digital representation 111. In some embodiments, the digital representation 111 can be the digital or electronic version of the trading card 107.

Then, in step 1701, a code reader 109 can read or be configured to read the machine readable code from the trading card 107 to determine a card identifier. In one embodiment, the code reader can be a standalone code reader 109 (e.g., bar code reading apparatus or equivalent) or a component of the UE 119 (e.g., a camera sensor capable of scanning, NFC module, Bluetooth module, etc.). The card identifier can be any identifier that can be used to match the trading card 107 to a respective digital representation 111. In one embodiment, the card identifier can be unique to individual trading cards 107, a series of trading cards 107 (e.g., associated with a team, organization, sport, and/or any other category of cards), trading cards 107 specific to subject, trading cards 107 specific to an artist, trading cards 107 specific to an artistic style, etc.

In step 1703, an apparatus (e.g., the trading card platform 101, application 117, and/or any associated device, system, or platform) queries or is configured to query for one or more attribute data records (e.g., any of the subject data 103, artist data 105, trading card data 113, sponsorship data 123, service data 123, content from content providers 133, etc.) associated with the trading card 107 based on the card identifier. In this embodiment, the one or more attribute data records store dynamic data associated with a subject, an artist, or a combination thereof of the trading card 101 and/or dynamic data associated with the of trading card 107 itself.

In step 1705, the apparatus receives an input specifying a time for generating a static instance of the dynamic data. In one embodiment, the time is directly specified (e.g., specified date, hour, minute, second, etc.) at which the apparatus is to generate the static instance (e.g., moment comprising the set of one or more data values of the dynamic data determined at the specified and recorded in a corresponding static instance data record to effectively "freeze" the moment).

In addition or alternatively, the input can specify an event. The time is then specified based on a pre-determined amount of time before or after the event or an instantaneous point in time after the event (e.g., after a record number of homeruns hit by a baseball player). For example, the apparatus can query a database of event information (e.g., sports schedule for a given subject, live stream or reporting of an event, etc.) and determine when or the time for generating the static instance based on the start, stop, duration time, etc. of the event retrieved from a database or live stream of event information. In one embodiment, the time for generating the static instance is offset from the start, stop, duration time, etc. of the event such as a pre-determined amount of time before or after the event. The pre-determined amount of time can be a fixed default value (e.g., 1 day before or 1 day after the event) or determined based on an event type (i.e., a score in a game, etc.), event duration, subject type, etc. The pre-determined amount of time or event type can also be specified by a user or be zero (i.e., the static instance is generated exactly at the specified time or occurrence of an event type).

In one embodiment, instead of a specific time, the input can specify criteria for criteria for determining the time for generating the static instance (optional step 1707). For example, the dynamic data includes a performance statistic (i.e., record setting, statistical milestone, event, etc.) associated with the subject, the artist, or a combination thereof. Then, the input can specify a performance statistic threshold value. In this case, the apparatus can be further configured to determine the time for generating the static instance based determining an actual time or a predicted time that the performance statistic in the dynamic data satisfies the performance statistic threshold value.

In use cases in which the trading card 107 is a sports trading card, the performance statistic can be sports performance statistics associated with a subject athlete. For example, the input can specify that a static instance to be created when an athlete reaches a performance threshold value that is specified as a sports milestone (e.g., a quarterback throws for more than 400 yards in a game, a basketball player blocking more than 10 shots in one game, etc.). It is noted that the example of sports performance statistics is provided by way of example and not as a limitation. The performance statistic and/or corresponding performance threshold can be based on any measurable statistic relevant to a field of endeavor engaged by the subject, artist, etc. associated with the trading card 107 (e.g., 100 m time for a sprinter, number of races by a racing car, auction valuable of a collectible item, etc.).

In step 1709, the apparatus is further configured to generate the static instance at the specified time. More specifically, the apparatus monitors for when the time is reached or for when the criteria for specifying the time are satisfied. Then, the apparatus queries a database comprising the dynamic data of the one or more attribute data records at the designated time. The values of one or more fields of the dynamic data at the specified time are then stored in corresponding data records which represent the static instance associated with the trading card 107 at the requested time.

In step 309, an application (e.g., application 117 alone or in combination with the trading card platform 101) presents or is otherwise configured to present a user interface 115 displaying, at least in part, a digital representation 111 of the trading card 107 comprising a representation of the static instance. The representation can be any time of audio and/or visual representation of the static instance including by not limited to badges indicating the time associated with the static instance, listings or other presentations of the fixed data values of the static instance, and/or a combination thereof.

In one embodiment, the static instance is part of a plurality of static instances, and wherein the apparatus is further configured to generate a respective trading card, a respective digital representation of the trading card, or a combination thereof for each of the plurality of static instances. The respective trading card, the respective digital representation of the trading card, or a combination thereof for each of the plurality of static instances are presented in the user interface as a trading card set. In one embodiment, the apparatus is further configured to generate the digital representation within a predetermined time period before or after the time for generating the static instance.

In one embodiment, the generating of the static instance can be implemented as part of sales management functions of the trading card platform 103. For example, the trading card platform 101 can determine sales periods (e.g., when the trading card 107 will be made available for sale on the trading card platform 101) based on the time when the static instance of the trading card 107 is generated. The apparatus, for instance, is further configured to flag the trading card, the digital representation, or a combination thereof as purchasable in the system within a predetermined time period before or after the time for generating the static instance. The trading card platform 101 can then use the flag to determine when to present the corresponding trading card 107 with the static instance available for purchase, trigger when the surface the presentation of the trading card 107 on the sales component of the trading card platform 101, etc.

In one embodiment, the process for generating the static instance of the trading card 107 can also be part of an automatic trading card production system. For example, after a digital representation of the trading card 107 comprising a representation of a static instance of the trading card 107 is generated (e.g., according to the various embodiments above), the digital representation can be converted to a printing format file (e.g., a PDF file or equivalent). Then, in optional step 1713, the apparatus and/or application is configured to transmit the digital representation (e.g., in a printing format file) to a printing device (e.g., to generate a physical card) within a predetermined time period before or after the time for generating the static instance.

Figure 18:
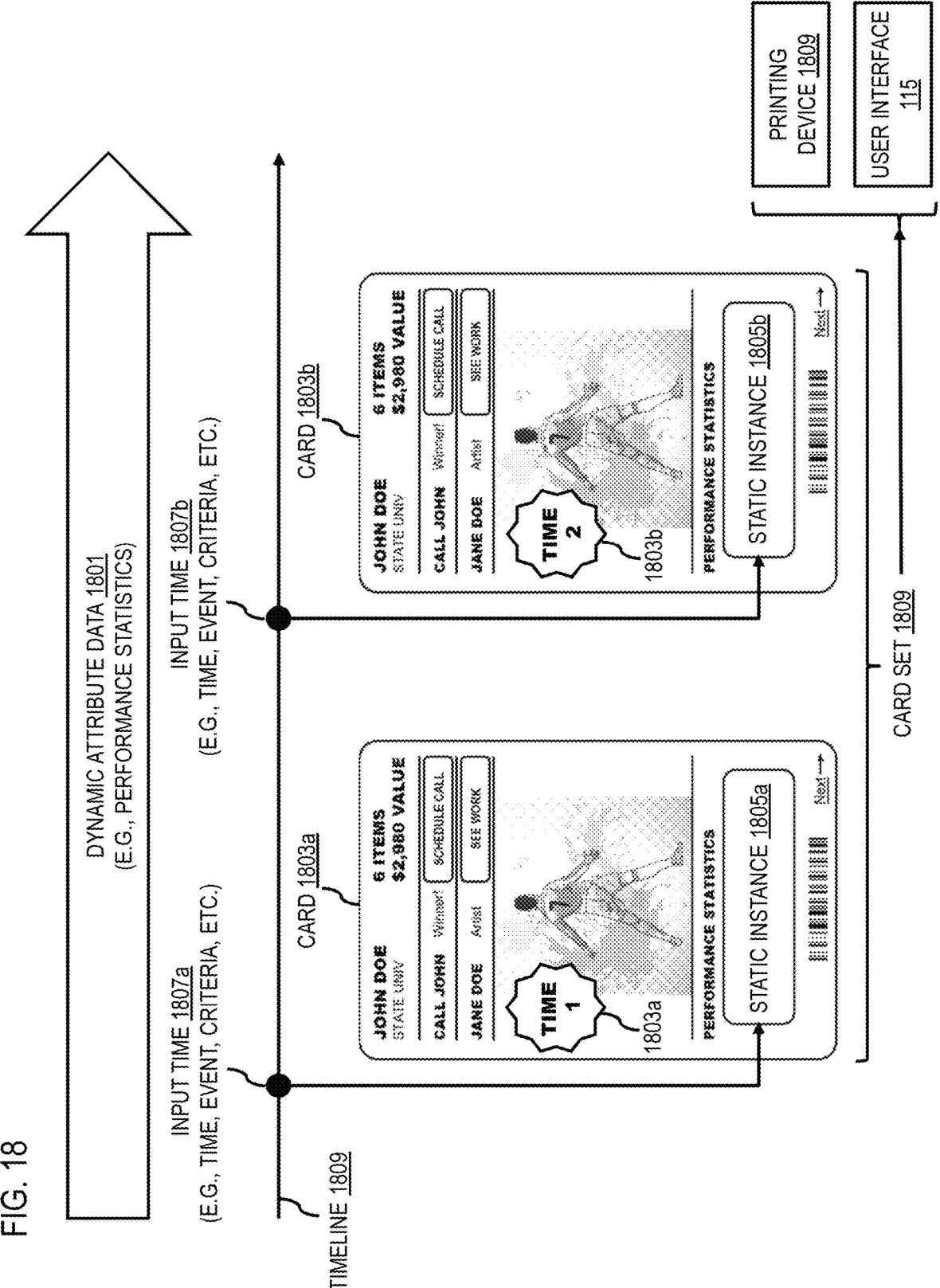
FIG. 18 is a diagram illustrating an example of freezing dynamic attributes of a trading card, according to one example embodiment.

FIG. 18 is a diagram illustrating an example of freezing dynamic attributes of a trading card, according to one example embodiment. In this example, dynamic attribute data 1801 (e.g., associated with performance statistics of an athlete such as but not limited to a soccer player) is monitored by the trading card platform 101 for the purposes of generating one or more trading cards 1803*a* and 1803*b* comprising respective static instances 1805*a* and 1805*b* of the dynamic attribute data 1801 (e.g., frozen soccer performance statistics of the subject athlete of the trading cards 1803*a* and 1803*b*). To generate the static instances 1805*a* and 1805*b*, the system 100 specifies two input times 1807*a* and 1807*b* at which the static instances 1805*a*. As described in the various embodiments above, the input times 1807*a* and 1807*b* can be specified as a specific time, event, criteria, etc. The trading card platform 101 then monitors a timeline 1809 to determine when the input times 1807*a* and 1807*b* are met or otherwise satisfied. At each input time 1807*a* and 1807*b*, the trading card platform 101 queries the dynamic attribute data for respective values of dynamic attribute data 1801 at the input times 1807*a* and 1807*b*. The respective values are then used to generate the static instances 1805*a* and 1805*b*. The trading cards 1803*a* and 1803*b* (e.g., digital representations with static instances 1805*a* and 1805*b*) can then be presented in the user interface 115 and/or transmitted to printing device 1809 to output physical versions of the trading cards 1803*a* and 1803*b*.

Returning to FIG. 1, as shown, the system 100 includes the trading card platform 101 alone or in combination with the application 117 to provide a digital infrastructure for providing trading cards 107 with intrinsic value related to associated sponsorship/promotional items according to the various embodiments described herein. In one embodiment, the trading card platform 101 includes or is otherwise associated with one or more machine learning models (e.g., neural networks or other equivalent network using algorithms such as but not limited to an evolutionary algorithm, reinforcement learning, or equivalent) for performing functions as discussed with respect to various embodiments described herein.

In one embodiment, the trading card platform 101 has connectivity over the communication network 127 to the services platform 129 that provides one or more services 131, one or more content providers 133, and other components of the system 100. By way of example, the services 131 may be third party services and include but is not social networking services, proxy communication services, shopping services, content (e.g., audio, video, images, etc.) management/delivery services, application services, storage services, contextual information determination services, location based services, information based services (e.g., weather, news, etc.), etc.

In one embodiment, the trading card platform 101 may be a platform with multiple interconnected components. The trading card platform 101 may include multiple servers, intelligent networking devices, computing devices, components, and corresponding software for providing a digital trading card functions according to the various embodiments described herein. In addition, it is noted that the trading card platform 101 may be a separate entity of the system 100, a part of the one or more services 131, a part of the services platform 129, or included within components of the UEs 119 or applications 117.

In one embodiment, content providers 133 may provide content or data (e.g., including programming content, broadcast content, streaming content, video on demand content, pay-per-view content, etc.) to the trading card platform 101, the services platform 129, the services 131, the UEs 119, and/or the applications 117 executing on the UEs 119. In one embodiment, the content providers 133 may provide content that may aid in digital trading card functions according to the various embodiments described herein. In one embodiment, the content providers 133 may also store content associated with the trading card platform 101, services platform 129, services 131, and/or any other component of the system 100. In another embodiment, the content providers 133 may manage access to a central repository of data, and offer a consistent, standard interface to data.

In one embodiment, the UEs 119 may execute software applications 117 to use or access data used and/or generated by the trading card platform 101 according to the embodiments described herein. By way of example, the applications 117 may also be any type of application that is executable on the UEs 119. In one embodiment, the applications 117 may act as a client for the trading card platform 101 and perform one or more functions associated with providing digital trading card functions alone or in combination with the trading card platform 101.

By way of example, the UEs 119 is or can include any type of embedded system, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UEs 119 can support any type of interface to the user (such as "wearable" circuitry, etc.). In one embodiment, the UEs 119 may be associated with the code reader 109 or include the code reader 109 as a component.

In one embodiment, the communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the trading card platform 101, services platform 129, services 131, UEs 119, and/or content providers 133 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for providing a digital trading card platform may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 19:
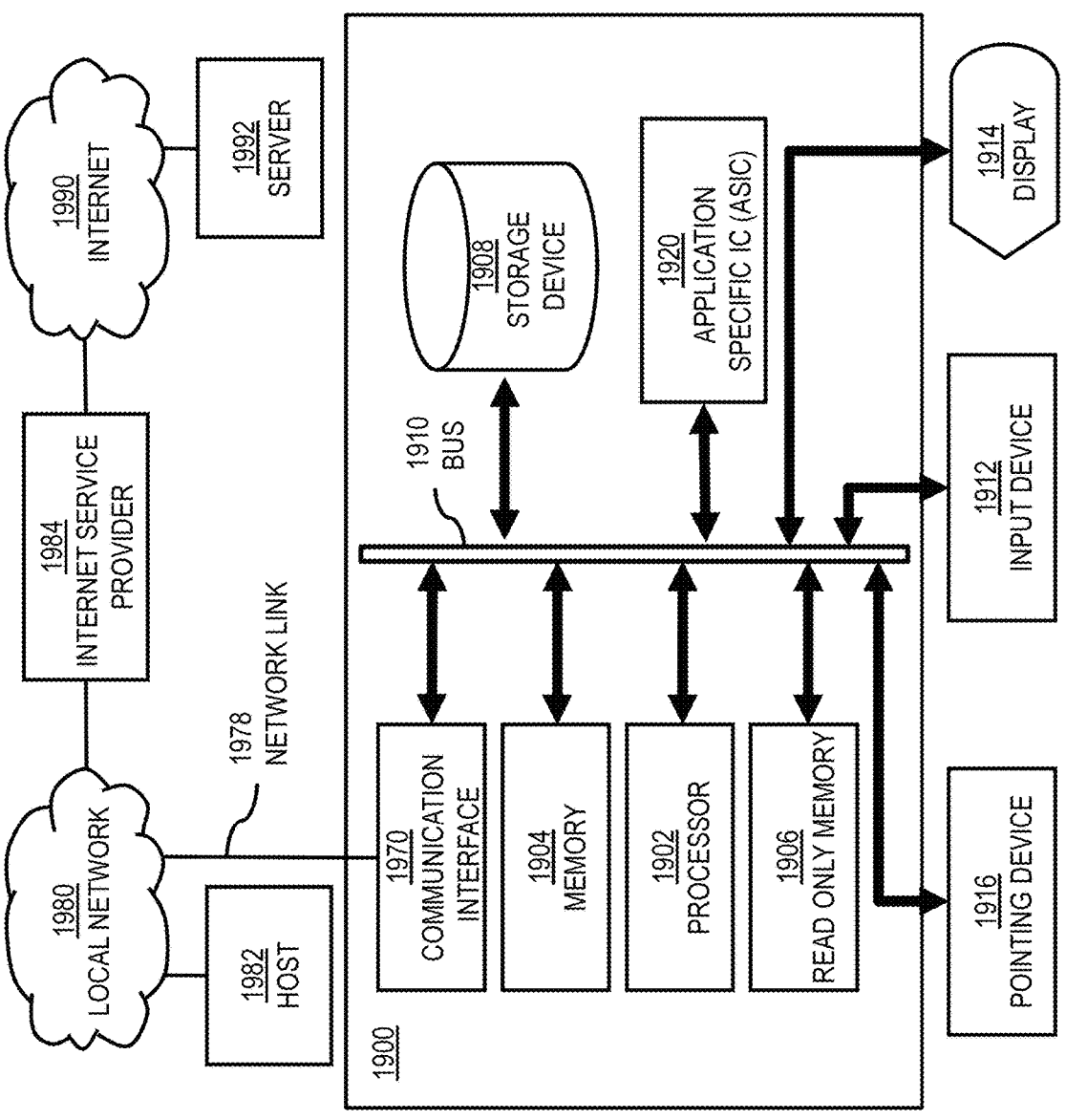
FIG. 19 is a diagram of hardware that can be used to implement an example embodiment of the processes described herein.

FIG. 19 illustrates a computer system 1900 upon which an embodiment of the invention may be implemented. Computer system 1900 is programmed (e.g., via computer program code or instructions) to provide a digital trading card platform as described herein and includes a communication mechanism such as a bus 1910 for passing information between other internal and external components of the computer system 1900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1910 includes one or more parallel conductors of information so that information is transferred quickly among devices coupled to the bus 1910. One or more processors 1902 for processing information are coupled with the bus 1910.

A processor 1902 performs a set of operations on information as specified by computer program code related to providing a digital trading card platform. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1910 and placing information on the bus 1910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1900 also includes a memory 1904 coupled to bus 1910. The memory 1904, such as a random access memory (RAM) or other dynamic storage device, stores information including processor instructions for providing a digital trading card platform. Dynamic memory allows information stored therein to be changed by the computer system 1900. RAM allows a unit of information stored at a location called a memory address to be stored and retrieved independently of information at neighboring addresses. The memory 1904 is also used by the processor 1902 to store temporary values during execution of processor instructions. The computer system 1900 also includes a read only memory (ROM) 1906 or other static storage device coupled to the bus 1910 for storing static information, including instructions, that is not changed by the computer system 1900. Some memory is composed of volatile storage that loses the information stored thereon when power is lost. Also coupled to bus 1910 is a non-volatile (persistent) storage device 1908, such as a magnetic disk, optical disk or flash card, for storing information, including instructions, that persists even when the computer system 1900 is turned off or otherwise loses power.

Information, including instructions for providing a digital trading card platform, is provided to the bus 1910 for use by the processor from an external input device 1912, such as a keyboard containing alphanumeric keys operated by a human user, or a sensor. A sensor detects conditions in its vicinity and transforms those detections into physical expression compatible with the measurable phenomenon used to represent information in computer system 1900. Other external devices coupled to bus 1910, used primarily for interacting with humans, include a display device 1914, such as a cathode ray tube (CRT) or a liquid crystal display (LCD), or plasma screen or printer for presenting text or images, and a pointing device 1916, such as a mouse or a trackball or cursor direction keys, or motion sensor, for controlling a position of a small cursor image presented on the display 1914 and issuing commands associated with graphical elements presented on the display 1914. In some embodiments, for example, in embodiments in which the computer system 1900 performs all functions automatically without human input, one or more of external input device 1912, display device 1914 and pointing device 1916 is omitted.

In the illustrated embodiment, special purpose hardware, such as an application specific integrated circuit (ASIC) 1920, is coupled to bus 1910. The special purpose hardware is configured to perform operations not performed by processor 1902 quickly enough for special purposes. Examples of application specific ICs include graphics accelerator cards for generating images for display 1914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1900 also includes one or more instances of a communications interface 1970 coupled to bus 1910. Communication interface 1970 provides a one-way or two-way communication coupling to a variety of external devices that operate with their own processors, such as printers, scanners and external disks. In general the coupling is with a network link 1978 that is connected to a local network 1980 to which a variety of external devices with their own processors are connected. For example, communication interface 1970 may be a parallel port or a serial port or a universal serial bus (USB) port on a personal computer. In some embodiments, communications interface 1970 is an integrated services digital network (ISDN) card or a digital subscriber line (DSL) card or a telephone modem that provides an information communication connection to a corresponding type of telephone line. In some embodiments, a communication interface 1970 is a cable modem that converts signals on bus 1910 into signals for a communication connection over a coaxial cable or into optical signals for a communication connection over a fiber optic cable. As another example, communications interface 1970 may be a local area network (LAN) card to provide a data communication connection to a compatible LAN, such as Ethernet. Wireless links may also be implemented. For wireless links, the communications interface 1970 sends or receives or both sends and receives electrical, acoustic or electromagnetic signals, including infrared and optical signals, that carry information streams, such as digital data. For example, in wireless handheld devices, such as mobile telephones like cell phones, the communications interface 1970 includes a radio band electromagnetic transmitter and receiver called a radio transceiver. In certain embodiments, the communications interface 1970 enables connection to the communication network 127 for providing a digital trading card platform.

The term computer-readable medium is used herein to refer to any medium that participates in providing information to processor 1902, including instructions for execution. Such a medium may take many forms, including, but not limited to, non-volatile media, volatile media and transmission media. Non-volatile media include, for example, optical or magnetic disks, such as storage device 1908. Volatile media include, for example, dynamic memory 1904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1978 typically provides information communication using transmission media through one or more networks to other devices that use or process the information. For example, network link 1978 may provide a connection through local network 1980 to a host computer 1982 or to equipment 1984 operated by an Internet Service Provider (ISP). ISP equipment 1984 in turn provides data communication services through the public, world-wide packet-switching communication network of networks now commonly referred to as the Internet 1990.

A computer called a server host 1992 connected to the Internet hosts a process that provides a service in response to information received over the Internet. For example, server host 1992 hosts a process that provides information representing video data for presentation at display 1914. It is contemplated that the components of system can be deployed in various configurations within other computer systems, e.g., host 1982 and server 1992.

FIG. 20 illustrates a chip set 2000 upon which an embodiment of the invention may be implemented. Chip set 2000 is programmed to provide a digital trading card platform as described herein and includes, for instance, the processor and memory components described with respect to FIG. 19 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 2000 includes a communication mechanism such as a bus 2001 for passing information among the components of the chip set 2000. A processor 2003 has connectivity to the bus 2001 to execute instructions and process information stored in, for example, a memory 2005. The processor 2003 may include one or more processing cores with each core configured to perform independently. A multi-core processor enables multiprocessing within a single physical package. Examples of a multi-core processor include two, four, eight, or greater numbers of processing cores. Alternatively or in addition, the processor 2003 may include one or more microprocessors configured in tandem via the bus 2001 to enable independent execution of instructions, pipelining, and multithreading. The processor 2003 may also be accompanied with one or more specialized components to perform certain processing functions and tasks such as one or more digital signal processors (DSP) 2007, or one or more application-specific integrated circuits (ASIC) 2009. A DSP 2007 typically is configured to process real-world signals (e.g., sound) in real time independently of the processor 2003. Similarly, an ASIC 2009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2003 and accompanying components have connectivity to the memory 2005 via the bus 2001. The memory 2005 includes both dynamic memory (e.g., RAM, magnetic disk, writable optical disk, etc.) and static memory (e.g., ROM, CD-ROM, etc.) for storing executable instructions that when executed perform the inventive steps described herein to provide a digital trading card platform. The memory 2005 also stores the data associated with or generated by the execution of the inventive steps.

Figure 21:
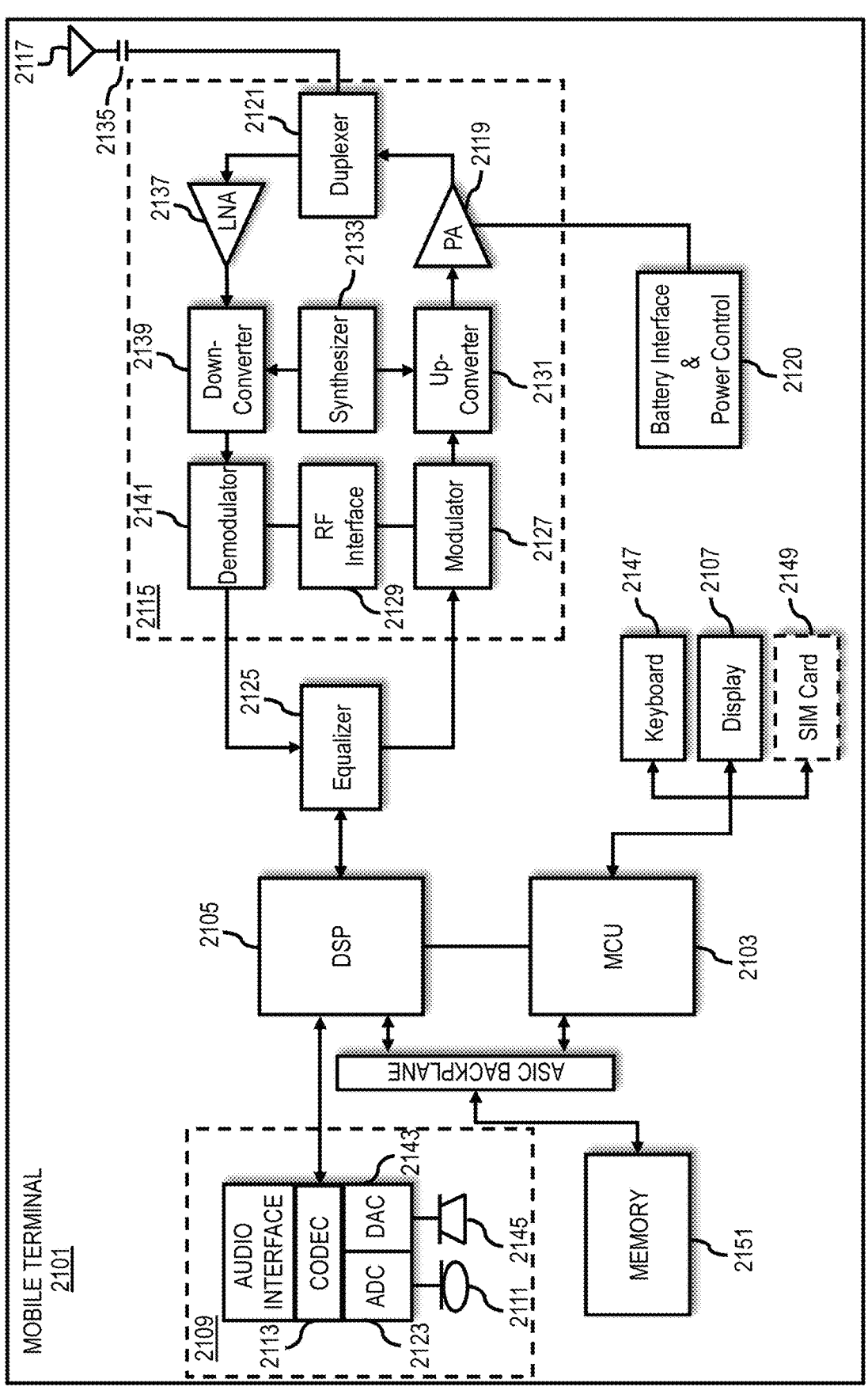
FIG. 21 is a diagram of a terminal that can be used to implement an example embodiment of the processes described herein.

FIG. 21 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 2103, a Digital Signal Processor (DSP) 2105, and a receiver/transmitter unit including a microphone gain control unit and a speaker gain control unit. A main display unit 2107 provides a display to the user in support of various applications and mobile station functions that offer automatic contact matching. An audio function circuitry 2109 includes a microphone 2111 and microphone amplifier that amplifies the speech signal output from the microphone 2111. The amplified speech signal output from the microphone 2111 is fed to a coder/decoder (CODEC) 2113.

A radio section 2115 amplifies power and converts frequency in order to communicate with a base station, which is included in a mobile communication system, via antenna 2117. The power amplifier (PA) 2119 and the transmitter/modulation circuitry are operationally responsive to the MCU 2103, with an output from the PA 2119 coupled to the duplexer 2121 or circulator or antenna switch, as known in the art. The PA 2119 also couples to a battery interface and power control unit 2120.

In use, a user of mobile station 2101 speaks into the microphone 2111 and his or her voice along with any detected background noise is converted into an analog voltage. The analog voltage is then converted into a digital signal through the Analog to Digital Converter (ADC) 2123. The control unit 2103 routes the digital signal into the DSP 2105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 2125 for compensation of any frequency-dependent impairments that occur during transmission though the air such as phase and amplitude distortion. After equalizing the bit stream, the modulator 2127 combines the signal with a RF signal generated in the RF interface 2129. The modulator 2127 generates a sine wave by way of frequency or phase modulation. In order to prepare the signal for transmission, an up-converter 2131 combines the sine wave output from the modulator 2127 with another sine wave generated by a synthesizer 2133 to achieve the desired frequency of transmission. The signal is then sent through a PA 2119 to increase the signal to an appropriate power level. In practical systems, the PA 2119 acts as a variable gain amplifier whose gain is controlled by the DSP 2105 from information received from a network base station. The signal is then filtered within the duplexer 2121 and optionally sent to an antenna coupler 2135 to match impedances to provide maximum power transfer. Finally, the signal is transmitted via antenna 2117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 2101 are received via antenna 2117 and immediately amplified by a low noise amplifier (LNA) 2137. A down-converter 2139 lowers the carrier frequency while the demodulator 2141 strips away the RF leaving only a digital bit stream. The signal then goes through the equalizer 2125 and is processed by the DSP 2105. A Digital to Analog Converter (DAC) 2143 converts the signal and the resulting output is transmitted to the user through the speaker 2145, all under control of a Main Control Unit (MCU) 2103—which can be implemented as a Central Processing Unit (CPU) (not shown).

The MCU 2103 receives various signals including input signals from the keyboard 2147. The keyboard 2147 and/or the MCU 2103 in combination with other user input components (e.g., the microphone 2111) comprise a user interface circuitry for managing user input. The MCU 2103 runs a user interface software to facilitate user control of at least some functions of the mobile station 2101 to provide a digital trading card platform. The MCU 2103 also delivers a display command and a switch command to the display 2107 and to the speech output switching controller, respectively. Further, the MCU 2103 exchanges information with the DSP 2105 and can access an optionally incorporated SIM card 2149 and a memory 2151. In addition, the MCU 2103 executes various control functions required of the station. The DSP 2105 may, depending upon the implementation, perform any of a variety of conventional digital processing functions on the voice signals. Additionally, DSP 2105 determines the background noise level of the local environment from the signals detected by microphone 2111 and sets the gain of microphone 2111 to a level selected to compensate for the natural tendency of the user of the mobile station 2101.

The CODEC 2113 includes the ADC 2123 and DAC 2143. The memory 2151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 2151 may be, but not limited to, a single memory, CD, DVD, ROM, RAM, EEPROM, optical storage, or any other non-volatile or non-transitory storage medium capable of storing digital data.

An optionally incorporated SIM card 2149 carries, for instance, important information, such as the cellular phone number, the carrier supplying service, subscription details, and security information. The SIM card 2149 serves primarily to identify the mobile station 2101 on a radio network. The card 2149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system comprising:
a trading card configured with a machine readable code, wherein the trading card is a physical trading card depicting a subject associated with performance statistics that are updated based on real-world events;
a code reader configured to read the machine readable code from the trading card to determine a card identifier;
an apparatus configured to:
query for one or more attribute data records associated with the trading card based on the card identifier, wherein the one or more attribute data records store dynamic data comprising the performance statistics of the subject, the performance statistics being updated over time based on the real-world events;
receive an input specifying a time or a particular real-world event for generating a static instance of the dynamic data to memorialize the performance statistics of the subject at the specified time or the specified particular real-world event; and
generate the static instance of the dynamic data at the specified time or upon an occurrence of the specified particular real-world event by fixing the performance statistics as they exist at the specified time or upon the occurrence of the specified particular real-world event; and
an application configured to present a user interface displaying a digital representation of the trading card, the digital representation comprising a visual representation of the generated static instance of the performance statistics,
wherein the input specifies a performance statistic threshold value, and wherein the apparatus is further configured to determine the time for generating the static instance based on determining an actual time or a predicted time that the performance statistic in the dynamic data satisfies the performance statistic threshold value.

2. The system of claim 1, wherein the time is specified based on a pre-determined or instantaneous amount of time before or after the event.

3. The system of claim 1, wherein the input specifies criteria for determining the time for generating the static instance.

4. The system of claim 3, wherein the dynamic data includes a performance statistic associated with a subject, an artist, or a combination thereof.

5. The system of claim 1, wherein the static instance is part of a plurality of static instances, and wherein the apparatus is further configured to generate a respective trading card, a respective digital representation of the trading card, or a combination thereof for each of the plurality of static instances.

6. The system of claim 5, wherein the respective trading card, the respective digital representation of the trading card, or a combination thereof for each of the plurality of static instances are presented in the user interface as a trading card set.

7. The system of claim 1, wherein the apparatus is further configured to transmit the digital representation of a printing device before or after the time for generating the static instance.

8. The system of claim 1, wherein the apparatus is further configured to generate the digital representation before or after the time for generating the static instance.

9. The system of claim 1, wherein the apparatus is further configured to flag the trading card, the digital representation, or a combination thereof as purchasable in the system before or after the time for generating the static instance.

10. The system of claim 1, wherein the apparatus is further configured to compute a value metric based on the one or more attribute data records and to present value metric in the user interface.

11. The system of claim 10, wherein the one or more attribute data records include one or sponsorship data records.

12. The system of claim 11, wherein the one or more sponsorship data records are associated with one or more redeemable items, one or more redeemable services, or a combination thereof; and wherein the apparatus is further configured to track a redemption of the one or more redeemable items, the one or more redeemable services, or a combination thereof.

13. The system of claim 11, wherein the one or more sponsorship data records are associated with one or more redeemable items, one or more redeemable services, or a combination thereof; and wherein the apparatus is further configured to track a redemption of the one or more redeemable items, the one or more redeemable services, or a combination thereof.

14. The system of claim 13, wherein the apparatus is further configured to update the value metric based on the redemption of the one or more redeemable items, the one or more redeemable services, or a combination thereof; and wherein the application is further configured to display the updated value metric in the user interface.

15. The system of claim 13, wherein the one or more redeemable services includes a subject of the trading card performing a task on a social media platform, wherein the apparatus is further configured to query the social media platform to determine a completion of the task, and wherein the redemption is tracked based on the completion of the task.

16. The system of claim 1, wherein the subject is an athlete; and wherein the one or more attributes of the subject includes one or more sports statistics.

17. The system of claim 1, wherein the apparatus is further configured to query for one or more artist attribute data records indicating one or more attributes of the artist, and to compute a value metric further based on the one or more artist attribute data records.

18. The system of claim 1, wherein the trading card is a digital trading card.

19. A system comprising:
a trading card configured with a machine readable code, wherein the trading card is a physical trading card depicting a subject associated with performance statistics that are updated based on real-world events;
a code reader configured to read the machine readable code from the trading card to determine a card identifier;
an apparatus configured to query for one or more attribute data records associated with the trading card based on the card identifier and to compute a value metric based on the one or more attribute data, wherein the one or more attribute data records store dynamic data comprising the performance statistics of the subject, the performance statistics being updated over time based on the real-world events; include one or more sponsorship data records; and an application configured to present a user interface displaying a digital representation of the trading card comprising the one or more attribute data records, the value metric, or a combination thereof, wherein the apparatus is further configured to:

query for one or more attribute data records associated with the trading card based on the card identifier, wherein the one or more attribute data records store dynamic data comprising the performance statistics of the subject, the performance statistics being updated over time based on the real-world events;

receive an input specifying a time or a particular real-world event for generating a static instance of the dynamic data to memorialize the performance statistics of the subject at the specified time or the specified particular real-world event; and generate the static instance of the dynamic data at the specified time or upon an occurrence of the specified particular real-world event by fixing the performance statistics as they exist at the specified time or upon the occurrence of the specified particular real-world event;

wherein the application is further configured to present the digital representation of the trading card, the digital representation comprising a visual representation of the generated static instance of the performance statistics; and wherein the input specifies a performance statistic threshold value, and wherein the apparatus is further configured to determine the time for generating the static instance based on determining an actual time or a predicted time that the performance statistic in the dynamic data satisfies the performance statistic threshold value.

\* \* \* \* \*